(12) United States Patent
Enomura et al.

(10) Patent No.: US 11,052,461 B2
(45) Date of Patent: Jul. 6, 2021

(54) METHOD OF PRODUCING SILICON COMPOUND COATED OXIDE PARTICLES, SILICON COMPOUND COATED OXIDE PARTICLES, AND SILICON COMPOUND COATED OXIDE COMPOSITION CONTAINING THE SAME

(71) Applicant: M. TECHNIQUE CO., LTD., Izumi (JP)

(72) Inventors: Masakazu Enomura, Izumi (JP); Daisuke Honda, Izumi (JP)

(73) Assignee: M. TECHNIQUE CO., LTD., Izumi (JP)

( * ) Notice: Subject to any disclaimer, the term of this patent is extended or adjusted under 35 U.S.C. 154(b) by 155 days.

(21) Appl. No.: 16/306,446

(22) PCT Filed: May 25, 2017

(86) PCT No.: PCT/JP2017/019469
§ 371 (c)(1),
(2) Date: Nov. 30, 2018

(87) PCT Pub. No.: WO2017/208951
PCT Pub. Date: Dec. 7, 2017

(65) Prior Publication Data
US 2019/0144681 A1 May 16, 2019

(30) Foreign Application Priority Data

Jun. 2, 2016 (JP) ............................. JP2016-111346
Jun. 3, 2016 (WO) .................. PCT/JP2016/066542
Jul. 11, 2016 (WO) .................. PCT/JP2016/083001

(51) Int. Cl.
*C09C 3/06* (2006.01)
*C09C 1/24* (2006.01)
(Continued)

(52) U.S. Cl.
CPC .......... *B22F 1/0062* (2013.01); *B22F 1/0018* (2013.01); *C01B 13/14* (2013.01);
(Continued)

(58) Field of Classification Search
CPC .. C08K 9/06; C09C 3/06; C09C 3/063; C09C 3/12
See application file for complete search history.

(56) References Cited

U.S. PATENT DOCUMENTS 4,729,785 A 3/1988 Schwab et al.
5,582,818 A * 12/1996 Nakanishi ................ A61K 8/25
424/59

(Continued)

FOREIGN PATENT DOCUMENTS

EP 2141205 A1 1/2010
EP 2740771 A1 6/2014
(Continued)

OTHER PUBLICATIONS

International Search Report (PCT/ISA/210) issued in PCT/JP2017/019469, dated Aug. 8, 2017.
(Continued)

*Primary Examiner* — Alexandre F Ferre
(74) *Attorney, Agent, or Firm* — Birch, Stewart, Kolasch & Birch, LLP

(57) ABSTRACT

The present invention is a method of producing silicon compound coated oxide particles in which at least a part of a surface of a metal oxide particle is coated with a silicon compound, wherein wettability and color characteristics are controlled by controlling a ratio of Si—OH bonds contained in the silicon compound coated oxide particles. By the present invention, silicon compound coated oxide particles having controlled wettability such as hydrophilicity, water repellency or oil repellency, and controlled color character-
(Continued)

istics of either reflectivity, molar absorption coefficient or transmittance can be provided.

15 Claims, 8 Drawing Sheets

(51) Int. Cl.
| | | |
|---|---|---|
| B22F 1/00 | (2006.01) | |
| C01G 49/06 | (2006.01) | |
| C01G 9/02 | (2006.01) | |
| C01B 33/02 | (2006.01) | |
| C01B 33/32 | (2006.01) | |
| C01G 53/00 | (2006.01) | |
| C01B 13/14 | (2006.01) | |
| C01F 17/206 | (2020.01) | |
| C01G 49/02 | (2006.01) | |
| C09D 7/62 | (2018.01) | |
| C09C 1/04 | (2006.01) | |
| C09C 3/12 | (2006.01) | |
| C01G 23/04 | (2006.01) | |

(52) U.S. Cl.
CPC ............ *C01B 13/145* (2013.01); *C01B 33/02* (2013.01); *C01B 33/325* (2013.01); *C01F 17/206* (2020.01); *C01G 9/02* (2013.01); *C01G 49/02* (2013.01); *C01G 49/06* (2013.01); *C01G 53/006* (2013.01); *C09C 1/043* (2013.01); *C09C 1/24* (2013.01); *C09C 3/06* (2013.01); *C09C 3/063* (2013.01); *C09C 3/12* (2013.01); *C09D 7/62* (2018.01); *B22F 2301/10* (2013.01); *B22F 2301/15* (2013.01); *B22F 2301/255* (2013.01); *B22F 2302/256* (2013.01); *B22F 2304/054* (2013.01); *B22F 2304/056* (2013.01); *C01G 23/04* (2013.01); *C01P 2002/01* (2013.01); *C01P 2002/02* (2013.01); *C01P 2002/70* (2013.01); *C01P 2002/72* (2013.01); *C01P 2002/82* (2013.01); *C01P 2004/03* (2013.01); *C01P 2004/04* (2013.01); *C01P 2004/50* (2013.01); *C01P 2004/62* (2013.01); *C01P 2004/64* (2013.01); *C01P 2004/80* (2013.01); *C01P 2006/60* (2013.01); *C01P 2006/62* (2013.01); *C01P 2006/66* (2013.01); *C01P 2006/90* (2013.01)

(56) References Cited

U.S. PATENT DOCUMENTS

| | | | |
|---|---|---|---|
| 6,235,270 | B1 | 5/2001 | Ishii et al. |
| 6,534,044 | B1 * | 3/2003 | Wada .................... C09C 3/006 424/59 |
| 10,071,396 | B2 | 9/2018 | Nakano et al. |
| 2004/0241189 | A1 | 12/2004 | Ishii et al. |
| 2010/0155310 | A1 | 6/2010 | Enomura |
| 2012/0021177 | A1 | 1/2012 | Kawai et al. |
| 2014/0037519 | A1 | 2/2014 | Kuraki et al. |
| 2015/0217332 | A1 | 8/2015 | Fujii et al. |
| 2017/0213624 | A1 | 7/2017 | Ohkoshi et al. |
| 2018/0186820 | A1 | 7/2018 | Katsukawa et al. |

FOREIGN PATENT DOCUMENTS

| | | |
|---|---|---|
| JP | 59-31004 A | 2/1984 |
| JP | 60-135506 A | 7/1985 |
| JP | 61-266705 | 11/1986 |
| JP | 2000-2274 A | 1/2000 |
| JP | 2002-286916 A | 10/2002 |
| JP | 2007-131460 A | 5/2007 |
| JP | 2009-112892 A | 5/2009 |
| JP | 2010-155727 A | 7/2010 |
| JP | 2012-36489 A | 2/2012 |
| JP | 4868558 B1 | 2/2012 |
| JP | 2014-42891 A | 3/2014 |
| JP | 2014-42892 A | 3/2014 |
| JP | 2016-11346 A | 1/2016 |
| JP | 2017-8268 A | 1/2017 |
| JP | 2017-71754 A | 4/2017 |
| JP | 6149283 B1 | 6/2017 |
| WO | WO 98/47476 A1 | 10/1998 |
| WO | WO 00/42112 A1 | 7/2000 |
| WO | WO 2009/008393 A1 | 1/2009 |
| WO | WO 2010/007956 A1 | 1/2010 |
| WO | WO 2016/009926 A1 | 1/2016 |

OTHER PUBLICATIONS

Extended European Search Report, dated Oct. 31, 2019, for European Application No. 17806508.2.

Japanese Office Action, dated Sep. 15, 2020, for Japanese Application No. 2017-198350, with an English translation.

* cited by examiner

Example 1-13

Comparative Example 1

METHOD OF PRODUCING SILICON COMPOUND COATED OXIDE PARTICLES, SILICON COMPOUND COATED OXIDE PARTICLES, AND SILICON COMPOUND COATED OXIDE COMPOSITION CONTAINING THE SAME

TECHNICAL FIELD

The present invention relates to a method of producing silicon compound coated oxide particles, silicon compound coated oxide particles, and a silicon compound coated oxide composition containing the same.

BACKGROUND ART

In recent years, for products requiring weather resistance such as an outer wall of a building, a coated body such as a signboard, vehicle, a transparent material such as a glass, transparent resin, and a textile product such as a clothing, etc., the following properties are required. The properties include not impairing aesthetic appearance, texture or designability; hardly getting dirty by a dust or substance, etc. contained in rainwater; and not degrading performance and designability of a product or a part incorporated in the product, etc. for a long time by self-cleaning function using properties of a substance contained in the product even if it gets dirty. For such purposes, as described in Patent Literature 1, it has been suggested to impart self-cleaning function by forming a layer containing oxide particles having photocatalytic activity such as titanium oxide in a product to decompose an organic substance or the like causing hydrophilization or stain by photocatalytic ability. However, in such a method, an organic substance or the like causing stain is once adhered or adsorbed to a product coating film etc. containing oxide particles having photocatalytic ability, and after that the stain is decomposed by photocatalytic ability possessed by titanium oxide or the like. Therefore, it is desired to prevent its adhesion and adsorption from the beginning. In addition, there are problems that an organic substance or the like of a resin or peripheral material contained in the product or coating film are also decomposed, and that a function or designability possessed by the coating film of the product or the product itself is lowered.

For this reason, as described in Patent Literature 2, a coating film or the like using a water repellent of an organic substance has been proposed. However, in these proposals, the organic substance itself is easily decomposed by ultraviolet rays and the like, and is unstable in terms of durability, so that a water repellent of an inorganic substance having high weather resistance has been desired. It has been proposed to impart water repellency and to prevent water adhesion and water drop adhesion by forming a coating film containing oxide particles having water repellency on the product, as proposed in Patent Literature 3 or 4. However, oxide microparticles having water repellency described in Patent Literature 3 are hydrophobic silica, and water repellency is occasionally insufficient. Furthermore, Patent Literature 3 does not disclose a material also having ultraviolet protection ability or near infrared protection ability which are necessary characteristics other than water repellency, or a material with delicately controlled color characteristics, and a composition using them. The water repellent base material using metal oxide microparticles described in Patent Literature 4, obtains the water repellency mainly by roughness formed on the surface layer of the base material by the aggregate of the metal oxide microparticles. It is not certain whether or not the water repellency of the metal oxide microparticles themselves is improved. The ultraviolet shielding or infrared shielding described in Patent Literature 4 is a property that a base material for forming a coating film using aggregates of the metal oxide microparticles may possess. Furthermore, the average reflectivity in the wavelength range of 300 nm to 1,300 nm described in Examples of Patent Literature 4 is also very low and 5% or less. However, Patent Literature 4 does not disclose a material having water repellency and ultraviolet protection ability or near infrared protection ability, or a composition using them, similarly to Patent Literature 3.

Patent Literature 5 describes particles obtained by further surface treatment of silica coated metal oxide particles with a hydrophobicity imparting material such as dimethylethoxysilane. However, the treatment of the particles with a hydrophobicity imparting material is solely for enhancing dispersibility in an oil dispersion medium such as polyglycerin triisostearate, silicone oil and squalane, for the purpose of cosmetics. Further, though Patent Literature 5 describes that a peak observed at 1,150 to 1,250 $cm^{-1}$ in an infrared absorption spectrum is based on absorption of deformation vibration of Si—OH, the peak should usually be assigned to the Si—O bond so that the description of Si—OH is a clerical error. Therefore, the amount of an Si—OH group contained in the silica coated metal oxide is not controlled in Patent Literature 5. Namely, Patent Literature 5 does not disclose a material having water repellency and ultraviolet protection ability or near infrared protection ability, or a composition using them, similarly to Patent Literature 3.

By the way, in general, when a ultraviolet absorption ability per unit mass in the wavelength range of 200 nm to 380 nm is higher, namely, a "molar absorption coefficient" is higher, the more ultraviolet rays can be absorbed by even a small amount. Therefore, when a molar absorption coefficient is high, even small amount exhibits ultraviolet absorption ability similar to or more than that of the conventional one, so that a haze value can be small, and transparency of a transparent material such as a coating material such as a coating film, a transparent resin, film or glass can be enhanced, and aesthetic appearance and designability can be enhanced.

Regarding a near infrared protection ability, for example, when a material absorbing near infrared rays is used for a glass or clear coating film, half of thermal energy derived from near infrared rays absorbed by the glass or clear coating film can be shielded in principle, but the other half is dissipated in the direction to be shielded. For example, in the case where heat rays are shielded by a glass using a near infrared absorbing agent, half of thermal energy can be released outside a room, but the other half is dissipated into a room, so that an actual heat shielding effect is not sufficient. Namely, a material having an excellent reflection property for near infrared rays, particularly, in the wavelength range of 780 nm to 2,500 nm, and also having no problem in terms of cost and environmental load in mining have been desired.

Patent Literatures 6 and 7 filed by the present applicant discloses a method of producing uniform oxide nanoparticles using a method of precipitating various nanoparticles such as oxide between two processing surfaces being capable of approaching to and separating from each other and rotating relative to each other. Patent Literature 6 describes separate production of an oxide and hydroxide. Patent Literature 7 describes production of uniform oxide. However, a method of producing an oxide in relation with ultraviolet protection ability or near infrared protection ability and control of water repellency or oil repellency, is not described in these patent literatures. From the above, a material and composition that effectively protect ultraviolet rays or near infrared rays and have controlled wettability such as water repellency, oil repellency or hydrophilicity have been desired.

CITATION LIST

Patent Literature

Patent Literature 1: JP 2002-286916
Patent Literature 2: JP 2017-8268
Patent Literature 3: JP 2010-155727
Patent Literature 4: WO 2010-007956
Patent Literature 5: WO 2000-42112
Patent Literature 6: JP 4868558
Patent Literature 7: WO 2009/008393

SUMMARY OF THE INVENTION

Technical Problem

In view of the above circumstances, an object of the present invention is to provide a method of producing silicon compound coated oxide particles, silicon compound coated oxide particles, and a silicon compound coated oxide composition using the same. Namely, an object of the present invention is to provide a method of producing silicon compound coated oxide particles, silicon compound coated oxide particles, and a silicon compound coated oxide composition using the same, wherein a ratio of Si—OH bonds contained in the silicon compound coated oxide particles, or a ratio of CF bonds/Si—OH bonds which is a ratio of CF bonds relative to Si—OH bonds contained in the silicon compound coated oxide particles, is controlled; and wettability such as water repellency, oil repellency or hydrophilicity and color characteristics of ultraviolet protection ability or near infrared protection ability are controlled, for the purpose of maximally enhancing properties originally possessed by oxides or for compensating for such properties. These utilizes the fact that a ratio of Si—OH bonds or a ratio of CF bonds/Si—OH bonds contained in the silicon compound coated oxide particles, is varied according to a manufacturing method or an environmental change after production. An object of the present invention is to control a transmittance or molar absorption coefficient in the ultraviolet wavelength range of 200 nm to 380 nm, in addition to wettability such as water repellency, oil repellency or hydrophilicity. An object of the present invention is to control reflectivity in the near infrared wavelength range of 780 nm to 2,500 nm. Further, an object of the present invention is to control a transmittance in the visible wavelength range of 380 nm to 780 nm. Furthermore, the inventors of the present invention have found that a ratio of Si—OH bonds or a ratio of CF bonds/Si—OH bonds contained in the silicon compound coated oxide particles is related to color characteristics, wettability such as water repellency, oil repellency or hydrophilicity of silicon compound coated zinc oxide particles, silicon compound coated iron oxide particles, silicon compound coated titanium oxide particles, or silicon compound coated cerium oxide particles, etc. which are the silicon compound coated oxide particles. The inventors of the present invention have also found that control of the ratio of Si—OH bonds or the ratio of CF bonds/Si—OH bonds contained in the silicon compound coated oxide particles improves characteristics of the silicon compound coated oxide particles. Thus, the inventors have accomplished the present invention. In addition, in view of the above mentioned circumstances, an object of the present invention is to provide a method of producing silicon compound coated oxide particles having controlled wettability such as water repellency, oil repellency or hydrophilicity, and also color characteristics such as ultraviolet protection ability or near infrared protection ability; to provide the silicon compound coated oxide particles; and to provide a composition containing the same.

Solution to the Problem

The inventors of the present application have found that a ratio of Si—OH bonds or a ratio of CF bonds/Si—OH bonds which is a ratio of CF bonds relative to Si—OH bonds contained in the silicon compound coated oxide particles, has relevance to wettability such as water repellency, oil repellency or hydrophilicity, and also color characteristics such as transmission property, absorption property, reflection property and the like of the silicon compound coated oxide particles, and has accomplished the present inventions.

Namely, the present invention is a method of producing silicon compound coated oxide particles in which at least a part of a surface of a metal oxide particle is coated with a silicon compound, wherein wettability and color characteristics are controlled by controlling a ratio of Si—OH bonds contained in the silicon compound coated oxide particles.

The present invention is also a method of producing silicon compound coated oxide particles in which at least a part of a surface of a metal oxide particle is coated with a silicon compound, wherein the silicon compound coated oxide particles comprise CF bonds, and wettability and color characteristics are controlled by controlling a ratio of CF bonds/Si—OH bonds which is a ratio of CF bonds relative to Si—OH bonds contained in the silicon compound coated oxide particles.

In the present invention, the wettability is preferably water repellency or oil repellency.

In the present invention, the color characteristics are preferably any one of reflectivity, transmittance, and molar absorption coefficient.

In the present invention, the ratio of Si—OH bonds or the ratio of CF bonds/Si—OH bonds contained in the silicon compound coated oxide particles is preferably calculated by separating waveforms of peaks derived from the silicon compound coated oxide particles between wavenumbers 650 cm$^{-1}$ and 1,300 cm$^{-1}$ in an infrared absorption spectrum measured by the total reflection measurement method (ATR method).

Further, in the present invention, the peak of the separated waveform derived from CF bonds is preferably a peak of the separated waveform in the wavenumber range of 1,200 cm$^{-1}$ to 1,220 cm$^{-1}$.

In the present invention, the ratio of Si—OH bonds contained in the silicon compound is preferably controlled by performing a modification treatment of a functional group contained in the silicon compound.

In the present invention, the modification treatment of a functional group is preferably a fluorinating treatment.

In the present invention, the fluorinating treatment is preferably trifluoromethylating treatment.

In the present invention, the ratio of Si—OH bonds contained in the silicon compound is preferably controlled in the state of a dispersion in which the silicon compound coated oxide particles are dispersed in a dispersion medium.

In the present invention, the ratio of Si—OH bonds contained in the silicon compound is preferably controlled by performing a heat treatment to the dispersion.

In the present invention, the ratio of Si—OH bonds contained in the silicon compound is preferably controlled between two processing surfaces being capable of approaching to and separating from each other and rotating relative to each other.

In the present invention, it is preferable that the dispersion is a coating film, film or glass, and the water repellency or oil repellency and color characteristics of the silicon compound coated oxide particles are controlled by performing a heat treatment to the dispersion.

In the present invention, an average reflectivity in the wavelength range of 780 nm to 2,500 nm is preferably controlled to be high, by controlling the ratio of Si—OH bonds to be low.

In the present invention, an average molar absorption coefficient in the wavelength range of 200 nm to 380 nm of a dispersion in which the silicon compound coated oxide particles are dispersed in an organic solvent, is preferably controlled to be high, by controlling the ratio of Si—OH bonds to be low.

Also, the present invention is silicon compound coated oxide particles, in which at least a part of a surface of a metal oxide particle is coated with a silicon compound, wherein wettability and color characteristics of the metal oxide particles are changed by coating at least a part of the surface of the metal oxide particle with the silicon compound;

a ratio of CF bonds/Si—OH bonds contained in the silicon compound coated oxide particles, which is calculated by separating waveforms of peaks derived from the silicon compound coated oxide particles between wavenumbers 650 $cm^{-1}$ and 1,300 $cm^{-1}$ in an infrared absorption spectrum measured by the total reflection measurement method (ATR method), is 0 or more and 4.5 or less; and an average molar absorption coefficient in the wavelength range of 200 nm to 380 nm in the state of a dispersion in which the silicon compound coated oxide particles are dispersed in a dispersion medium, is 650 L/(mol·cm) or more.

The present invention is also the silicon compound coated oxide particles wherein the ratio of Si—OH bonds contained in the silicon compound coated oxide particles is 5% or more and 70% or less.

The present invention is also the silicon compound coated oxide particles wherein an oxide constituting the metal oxide particles is at least one selected from the group consisting of zinc oxide, iron oxide, cerium oxide and titanium oxide.

The present invention is also preferably the silicon compound coated oxide particles wherein an average reflectivity in the wavelength range of 780 nm to 2,500 nm of the silicon compound coated oxide particles is 50% or more.

The present invention is also preferably the silicon compound coated oxide particles wherein an average transmittance for the lights of wavelengths 200 nm to 380 nm in the state of a dispersion in which the silicon compound coated oxide particles are dispersed in a dispersion medium, is 15% or less, and an average transmittance for the lights of wavelengths of 380 nm to 780 nm is 80% or more.

The present invention is also preferably the silicon compound coated oxide particles wherein oxide particles constituting the metal oxide particles are composite oxide particles composed of two or more kinds of elements, and color characteristics of the silicon compound coated oxide particles are in the range of 40≤L*≤95, −35≤a*≤35, or −35≤b*≤35 in the L*a*b* color system.

The present invention is also preferably the silicon compound coated oxide particles wherein the silicon compound is a silicon compound containing an amorphous silicon oxide.

The present invention is also preferably the silicon compound coated oxide particles wherein a contact angle of a water drop to a coated surface coated with the silicon compound coated oxide particles is 110° or more.

The present invention can be performed as a silicon compound coated oxide composition for ultraviolet protection and water repellency or oil repellency, comprising the silicon compound coated oxide particles.

Advantageous Effects of the Invention

The present invention can provide silicon compound coated oxide particles wherein a ratio of Si—OH bonds or a ratio of CF bonds/Si—OH bonds which is a ratio of CF bonds relative to Si—OH bonds contained in the silicon compound coated oxide particles, is controlled, and wettability such as water repellency, oil repellency or hydrophilicity is controlled, and color characteristics of any one of reflectivity, molar absorption coefficient or transmittance are controlled. Because it is possible to strictly control wettability such as water repellency, oil repellency or hydrophilicity, and color characteristics of the silicon compound coated oxide particles, by controlling the ratio of Si—OH bonds or the ratio of CF bonds/Si—OH bonds which is a ratio of CF bonds relative to Si—OH bonds, design of a more appropriate composition can become facilitated, compared with a conventional composition, in terms of increased demand to silicon compound coated oxide particles, diversified usages and desired properties.

DESCRIPTION OF THE INVENTION

Figure 1:
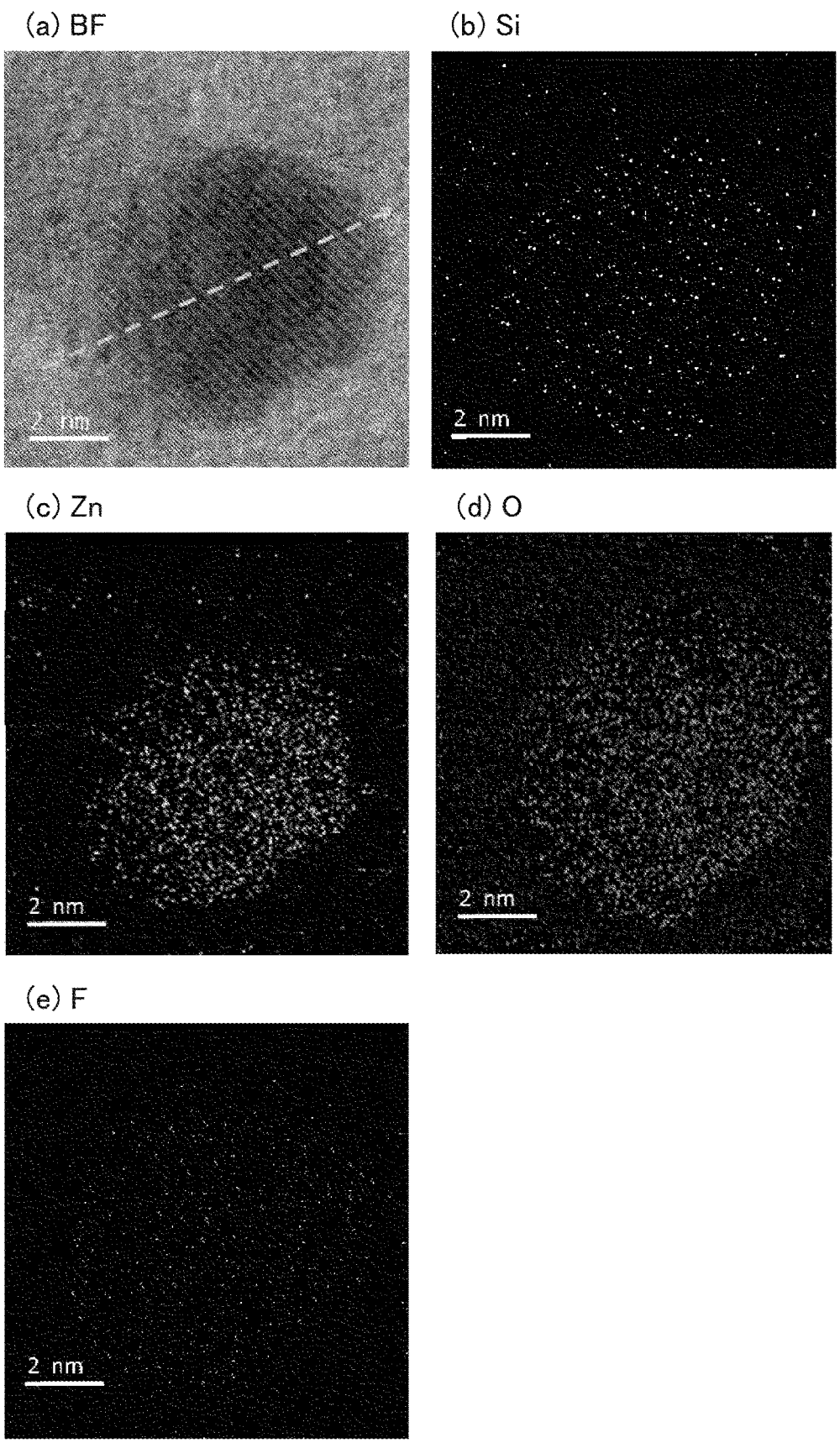
FIG. 1 shows an STEM mapping result of the silicon compound coated zinc oxide particles obtained in Example 1-2.

Hereinafter, the present invention is explained by embodiments of the present invention based on the drawings as an example. However, embodiments of the present invention are not limited only to the embodiments described hereinafter.

(Silicon Compound Coated Oxide Particles and Silicon Compound Coated Oxide Particle Composition)

In the silicon compound coated oxide particles of the present invention, a ratio of Si—OH bonds or a ratio of CF bonds/Si—OH bonds which is a ratio of CF bonds relative to Si—OH bonds contained in the silicon compound coated oxide particles is controlled, and the particles are silicon compound coated oxide particles having controlled color characteristics of reflectivity, molar absorption coefficient or transmittance, in addition to wettability such as water repellency, oil repellency or hydrophilicity. The silicon compound coated oxide particles of the present invention can be used as a composition suitable for effectively shielding ultraviolet rays or near infrared rays according to the purpose in addition to controlled water repellency or oil repellency, when used for a composition intended for use as a coating film, sealing material or coated body, a composition intended for use in a textile such as clothes, a composition for use in a clear coating film or glass for which transparency is required, or a composition for use in a transparent resin or film like composition. Furthermore, since it is possible to obtain a composition having high transmission property or transparency in the visible region, it is possible to provide a silicon compound coated metal oxide composition for water repellency or oil repellency which does not impair designability, aesthetic appearance or texture for a long time, and can be effectively used. Incidentally, the composition requiring transparency includes, for example, a composition contained in a glass, transparent resin or clear coating film, a film like composition used for a film combined with a glass, such as one attaching to a glass or transparent resin, and a paint for coating on a glass or transparent resin.

Embodiment-1 of Silicon Compound Coated Oxide Particles

The silicon compound coated oxide particles of the present invention are silicon compound coated oxide particles in which at least a part of a surface of a metal oxide particle is coated with a silicon compound. The metal is metal oxide particles containing a single element or a plurality of different elements of a metal element or a metalloid element in the chemical periodic table. The metal element in the present invention is not particularly limited, but includes preferably a divalent or trivalent metal element, more preferably a metal element such as Zn, Fe, Ce, Ti and the like. A metalloid element in the present invention is not particularly limited, but preferably includes a metalloid element such as Si, Ge, As, Sb, Te, Se and the like. These metals and metalloids may be metal oxide particles composed of a single metal element, or may be composite metal oxide particles composed of a plurality of metal elements or composite metal oxide particles containing a metal element and a metalloid element. However, since the present invention is silicon compound coated oxide particles, in the case where Si is contained in elements constituting the metal oxide, the metal oxide must be an oxide consisting of Si and a metal element or a plurality of elements with a metalloid element different from Si.

Embodiment-2 of Silicon Compound Coated Oxide Particles

The silicon compound coated oxide particles of the present invention are not limited to particles composed only of oxides. Oxide particles containing a compound other than oxides may be also used to the extent that the compound does not affect the present invention. For example, silicon compound coated metal oxide particles in which at least a part of a surface of a metal oxide particle or composite metal oxide particle containing a compound other than oxides is coated with a silicon compound, may be used. Examples of the above compound other than oxides include a hydroxide, nitride, carbide, various salts such as a nitrate and sulfate, and a hydrate and organic solvate.

Embodiment-3 of Silicon Compound Coated Oxide Particles

The silicon compound coated oxide particles of the present invention are silicon compound coated oxide particles in which a ratio of Si—OH bonds or a ratio of CF bonds/Si—OH bonds being a ratio of CF bonds relative to Si—OH bonds contained in the silicon compound coated oxide particles, is controlled. Therefore, the silicon compound coated oxide particles of the present invention include at least silicon (Si) and oxygen (O). A method of evaluating that silicon (Si) and oxygen (O) are contained, is preferably a method of observing a plurality of particles using a transmission electron microscope (TEM) or a scanning transmission electron microscope (STEM), and confirming a presence ratio and presence position of silicon relative to elements other than silicon in each particle by an energy dispersive X-ray analyzer (EDS). The examples include a method of evaluating uniformity by specifying a presence ratio (molar ratio) of silicon and elements other than silicon contained in a single silicon compound coated oxide particle and calculating an average value of the mole ratio and its variation coefficient in the plurality of silicon compound coated oxide particles, or a method of specifying a presence position of silicon contained in the silicon compound coated oxide particles by mapping. The silicon compound coated oxide particles of the present invention are preferably silicon compound coated oxide particles in which silicon is detected in the vicinity of the surface layer of the particles in the STEM mapping or linear analysis. The silicon compound coated oxide particles of the present invention may be used as silicon compound coated oxide particles in which at least a part of a surface of the metal oxide particle is coated with a silicon compound. However, when used in the composition requiring weather resistance such as a glass or clear coating film, photocatalytic ability generated by micronization of oxide particles is preferably suppressed by coating at least a part of a surface of the particle with the silicon compound. Further, there is an advantage that chemical stability such as water resistance and acid/alkali resistance can be imparted to the oxide by coating a surface of the oxide particles with a silicon compound.

Embodiment-4 of Silicon Compound Coated Oxide Particles

In the silicon compound coated oxide particles of the present invention, preferably a fluorine (F) is contained, and more preferably CF bonds are contained, in order to control wettability such as water repellency, oil repellency or hydrophilicity. Further preferably, the CF bonds are a fluorine or CF bonds derived from a trifluoromethyl group. Preferably, the fluorine or CF bonds are mainly present on the surface side of the silicon compound coated oxide particles for the purpose of water repellency or oil repellency. However, in the present invention, the fluorine or CF bonds may be present inside the silicon compound coated oxide particles. Since critical surface tension of trifluoromethyl group ($CF_3$ group) is very small and about 6 mN/m, water repellency and oil repellency can be enhanced by including $CF_3$ groups in the particles, especially on the surface of the particles. Further, water repellency, oil repellency, color characteristics such as ultraviolet absorption ability and near infrared reflection ability of the silicon compound coated oxide particles can be controlled, by controlling a ratio of CF bonds. A method of evaluating that a fluorine is contained in the silicon compound coated oxide particles, includes the same method as that mentioned for silicon or oxygen.

(Explanation-1 of Si—OH Bonds and CF Bonds)

In the present invention, wettability such as water repellency or oil repellency and various color characteristics such as reflectivity, transmittance, molar absorption coefficient and the like are controlled by controlling a ratio of Si—OH bonds or a ratio of CF bonds/Si—OH bonds being a ratio of CF bonds relative to Si—OH bonds contained in the silicon compound coated oxide particles. The ratio of Si—OH bonds or the ratio of CF bonds/Si—OH bonds can be determined based on the FT-IR measurement results as an example. Here, IR is an abbreviation of infrared absorption spectroscopy (hereinafter, simply referred to as IR). In addition, the ratio of Si—OH bonds or the ratio of CF bonds/Si—OH bonds may be measured by a method other than IR measurement, and the examples include an X-ray photoelectron spectroscopy (XPS), solid nuclear magnetic resonance (solid NMR), electron energy loss spectroscopy (EELS), and the like.

(Explanation-2 of Si—OH Bonds and CF Bonds)

In the present invention, a ratio of Si—OH bonds or a ratio of CF bonds/Si—OH bonds contained in the silicon compound coated oxide particles is preferably calculated by waveform separation of the peaks in the wavenumber range of 650 $cm^{-1}$ to 1,300 $cm^{-1}$ in an infrared absorption spectrum measurement of the silicon compound coated oxide particles. Preferred are oxide particles having wettability such as water repellency, oil repellency or hydrophilicity and color characteristics controlled by controlling an area ratio of a peak obtained by separating waveforms as a peak from Si—OH bonds relative to a total area of peaks obtained by separating waveforms in the wavenumber range of 650 $cm^{-1}$ to 1,300 $cm^{-1}$, or a ratio of a peak obtained by separating waveforms as a peak from CF bonds relative to a peak obtained by separating waveforms as a peak from Si—OH bonds (a ratio of CF bonds/Si—OH bonds), wherein a peak obtained by separating waveforms in the wavenumber range of 850 $cm^{-1}$ to 950 $cm^{-1}$, preferably a peak obtained by separating waveforms in the wavenumber range of 890 $cm^{-1}$ to 920 $cm^{-1}$ is assigned as a peak derived from Si—OH bonds, and a peak obtained by separating waveforms in the wavenumber range of 1,200 $cm^{-1}$ to 1,220 $cm^{-1}$ is assigned as a peak derived from CF bonds. It is considered that all vibrations of functional groups having CF bonds such as $CF_3$ group, $CF_2$ group and CF group are detected in the wavenumber range of 1,200 $cm^{-1}$ to 1,220 $cm^{-1}$. Accordingly, it is preferable that total area of one or a plurality of peaks derived from CF bonds which waveforms are separated in the wavenumber range of 1,200 $cm^{-1}$ to 1,220 $cm^{-1}$, is the area of CF bonds. With respect to a peak derived from Si—OH bonds which waveforms are separated in the wavenumber range of 850 $cm^{-1}$ to 950 $cm^{-1}$, it is also considered that waveforms of different vibrations derived from Si—OH bonds may be separated into a plurality of peaks in the wavenumber range of 850 $cm^{-1}$ to 950 $cm^{-1}$ similarly to the CF bonds. However, it is preferable to select a peak having the largest area ratio among peaks which waveforms are separated in the wavenumber range of 850 $cm^{-1}$ to 950 $cm^{-1}$ as a representative peak of Si—OH bonds, and thereby calculate a ratio of Si—OH bonds or a ratio of CF bonds/Si—OH bonds.

(Explanation of Amorphous Silicon Oxide)

In the present invention, the silicon compound coating at least a part of a surface of the metal oxide particle preferably contains an amorphous silicon oxide, because in particular a ratio of Si—OH bonds can be easily controlled. A method of evaluating that the silicon compound contains an amorphous silicon oxide is not particularly limited. However, the examples include a method of evaluating in combination of confirmation of presence of Si and O by an STEM mapping, and confirmation of presence of silicon oxide by an infrared absorption spectrum, and confirmation that a peak derived from crystalline silica ($SiO_2$) is not observed in an XRD measurement; and a method of confirming that a crystal lattice is not observed in a site where Si and O are detected in TEM observation or STEM observation, and the like.

(Average Molar Absorption Coefficient)

A molar absorption coefficient can be calculated from an absorbance and a molar concentration of a substance to be measured in a measurement sample in ultraviolet-visible absorption spectrum measurement, by Formula 1 below.

$$\varepsilon = A/(c \cdot l) \quad \text{(Formula 1)}$$

In Formula 1, $\varepsilon$ is a constant specific to the substance, and is referred to as a molar absorption coefficient. Since it means an absorbance of a dispersion at 1 mol/L with a thickness of 1 cm, the unit is L/(mol·cm). A is an absorbance in ultraviolet-visible absorption spectrum measurement. c is a molar concentration of a sample (mol/L). l is a length through which a light is transmitted (optical path length), typically a thickness of a cell in measuring the ultraviolet-visible absorption spectrum. In the present invention, in order to show ability to absorb lights in the ultraviolet wavelength range of 200 nm to 380 nm, a simple average of the molar absorption coefficients for a plurality of wavelengths in the measurement wavelength range of 200 nm to 380 nm is calculated and evaluated as an "average molar absorption coefficient".

(Color Characteristics other than Molar Absorption Coefficient)

In the present invention, in the same manner as a molar absorption coefficient and an average molar absorption coefficient in the ultraviolet region in the wavelength range from 200 nm to 380 nm, by controlling the ratio of Si—OH bonds or the ratio of CF bonds/Si—OH bonds, color characteristics such as a transmittance and average transmittance in a specific region of the visible wavelength range of 380 nm to 780 nm, and a reflectivity and average reflectivity in a specific region in the near infrared wavelength range of 780 nm to 2,500 nm, can be accurately and strictly controlled. Thereby, particularly silicon compound coated oxide particles having water repellency and oil repellency, suitable for a composition for ultraviolet protection or near infrared protection can be provided. Due to the ability to efficiently protect lights in the ultraviolet protection or near infrared region by the silicon compound coated oxide particles having these controlled color characteristics, the silicon compound coated oxide particles are suitable for a composition for ultraviolet protection or near infrared protection for not impairing aesthetic appearance and texture of a coated body or glass itself or designability, or a composition for a transparent material used for not impairing aesthetic appearance, designability or product properties of interior decorative articles or equipment having a glass containing the silicon compound coated oxide particles of the present invention.

(Silicon Compound Coated Oxide Particles for Coloring)

A silicon compound coated oxide particle composition for coloring having controlled wettability such as water repellency, oil repellency or hydrophilicity and color characteristics, can be provided by coloring silicon compound coated oxide particles in which at least a part of a surface of a metal oxide particle is coated with a silicon compound, by using as the metal oxide particle a metal oxide particle consisting of at least two kinds of elements selected from the above metal elements and metalloid elements; and using the colored silicon compound coated oxide particles as the composition. In particular, by controlling a molar ratio of two kinds of metal elements or metalloid elements (M2/M1: M1 and M2 are respectively a metal element or metalloid element) in a metal oxide particle composed of at least two kinds of elements selected from the metal elements or metalloid elements, a transmittance and average transmittance in the visible wavelength range of 380 nm to 780 nm, and color characteristics such as a hue H (=b*/a*) and chroma C (=((a*)$^2$+(b*)$^2$)$^{1/2}$) in the L*a*b* color system, can be accurately and strictly controlled. The composition is suitable for use in a composition for coating or a composition for a transparent material which does not impair aesthetic appearance, texture, or aesthetic appearance due to its ability to efficiently protect lights in the ultraviolet region. The composition is also suitable for use in a composition for coloring because it can be colored positively depending on the purpose. As a plurality of different elements: M1 and M2 for the purpose of coloring, the present invention is not limited to a composite oxide composed of two kinds of metal elements or metalloid elements. An oxide composed of three or more kinds of metal elements or metalloid elements such as M1, M2, M3 ... Mn, may be used in the present invention.

(Color Characteristics: Hue or Chroma)

A hue or chroma in the present invention may be indicated by a hue H (=b*/a*, b*>0, a*>0) or chroma C=((a*)$^2$+(b*)$^2$)$^{1/2}$ in the L*a*b* color system. Here, the L*a*b* color system is one of the uniform color space and L* indicates a value representing brightness, and a larger numerical value indicates as being brighter. Also, a* and b* indicate chromaticity. In the present invention, the color system is not limited to the L*a*b* color system. Color characteristics may be evaluated using other color systems such as XYZ system. Further, in the present invention, by controlling color characteristics to be in the range of 40≤L*≤95 in the L*a*b* color system, coloring can be controlled from dark color to bright color. By controlling color characteristics in the range of −35≤a*≤35 or −35≤b*≤35, preferably in the range of −30≤a*≤30 or −30≤b*≤30, coloring can be brought close to a color friendly to human eyes without too strong tinting strength. Thereby, the present invention is especially suitable for use as a composition for coloring for ultraviolet protection.

(Control of Ratio of Si—OH Bonds or CF Bonds: Explanation of Method-1)

In the present invention, a method of controlling the ratio of Si—OH bonds or the ratio of CF bonds/Si—OH bonds is not particularly limited, but it is preferable to control the ratio of Si—OH bonds or the ratio of CF bonds/Si—OH bonds by a modification treatment of a functional group contained in the silicon compound coated oxide particles. In particular, in the case of imparting CF bonds to the silicon compound coated oxide particles, it is preferable that the modification treatment of a functional group is a fluorinating treatment. The modification treatment of a functional group may be performed by a method using a reaction such as a substitution reaction, addition reaction, elimination reaction, dehydration reaction, condensation reaction to a functional group contained in the silicon compound coated oxide particles, to control the ratio of Si—OH bonds or the ratio of CF bonds/Si—OH bonds. In controlling the ratio of Si—OH bonds or the ratio of CF bonds/Si—OH bonds, the ratio of CF bonds or Si—OH bonds may be increased or decreased. In the present invention, by the above control, CF bonds can be imparted to the silicon compound coated oxide particles, for example by an esterification reaction achieved by a dehydration and condensation reaction in which OH is removed from a carboxyl group (—COOH) of a carboxylic acid having a $CF_3$ group such as trifluoroacetic anhydride, and H is removed from a hydroxyl group (—OH) of an Si—OH group contained in the silicon compound coated oxide particles. In the case of imparting CF bonds to the silicon compound coated oxide particles by an esterification reaction, the ratio of Si—OH bonds can be decreased and the ratio of CF bonds can be increased, and furthermore, a carbonyl group (—C(=O)—) being a hydrophilic functional group can also be imparted, so that more strict control of wettability such as water repellency and oil repellency is possible. In an esterification reaction, in addition to the method using an acid anhydride, a method using a mixed acid anhydride, an acid halide or the like, or a method using a dehydrating agent such as a carbodiimide or the like can also be used. Further to the esterification reaction, it is also possible to control the ratio of Si—OH bonds or the ratio of CF bonds/Si—OH bonds by a method of forming an ether bond between a fluorine containing substance and Si by dehydration by reacting a substance having a fluorine and a hydroxyl group, or an alkyl halide, aryl halide, or heteroaryl halide having a fluorine with an Si—OH group, preferably in the presence of an acid catalyst; or by a method of forming a (thio)urethane bond by reacting an isocyanate or thioisocyanate containing a fluorine with an Si—OH group, or the like. Further, the present invention is not limited to formation of other new bonds by directly reacting another substance or functional group with Si—OH bonds. For example, the ratio of Si—OH bonds or the ratio of CF bonds/Si—OH bonds can also be controlled by a method of reacting a fluorine containing carboxylic acid contained in a carbodiimide or the like. The ratio of Si—OH bonds or the ratio of CF bonds/Si—OH bonds can also be controlled by a method of reacting hydrogen peroxide or ozone to the oxide particles. The ratio of Si—OH bonds or the ratio of CF bonds/Si—OH bonds can also be controlled by a method of controlling formulation of the oxide raw material liquid or the oxide precipitation solvent or the pH or the like, at the time of precipitating the silicon compound coated oxide particles. In addition, the ratio of Si—OH bonds or the ratio of CF bonds/Si—OH bonds can also be controlled by a method of a heat treatment of the silicon compound coated oxide particles as an example of a dehydration reaction. In the case where the ratio of Si—OH bonds or the ratio of CF bonds/Si—OH bonds is controlled by a method of a heat treatment of the silicon compound coated oxide particles, a dry heat treatment may be performed, or a heat treatment of the silicon compound coated oxide particles in the state of a dispersion in which the silicon compound coated oxide particles are dispersed in a dispersion medium. Further, as explained below, the silicon compound coated oxide particles may be dispersed in a desired solvent, and a substance containing a functional group may be added to the dispersion, and the mixture may be subjected to a treatment such as stirring to control the ratio of Si—OH bonds or the ratio of CF bonds/Si—OH bonds. Alternatively, a dispersion containing the precipitated silicon compound coated oxide particles prepared by mixing the oxide raw material liquid, the oxide precipitation solvent and the silicon compound raw material liquid, as it is, may be subject to a treatment such as stirring to control the ratio of Si—OH bonds or the ratio of CF bonds/Si—OH bonds. Further, in a method of removing impurities and the like from a slurry containing the silicon compound coated oxide particles by a dispersion treatment of the particles and a cross flow type membrane filtration treatment using a device in which a dispersing device and a filtration membrane are connected continuously, the slurry temperature or the temperature of the cleaning solution used for the cross flow may be changed to control the ratio of Si—OH bonds or the ratio of CF bonds/Si—OH bonds. In this case, since a uniform modification treatment can be performed on a primary particle of the silicon compound coated oxide particles, particularly on a surface of each primary particle, it is an advantage that the ratio of Si—OH bonds or the ratio of CF bonds/Si—OH bonds contained in the silicon compound coated oxide particles of the present invention, and water repellency or oil repellency and color characteristics can be strictly and homogeneously controlled.

The pH at precipitating the silicon compound coated oxide particles may be adjusted by adding a pH adjusting agent such as an acidic substance or a basic substance in at least one of various solutions and solvents in the present invention, or may be adjusted by changing a flow rate at the time of mixing the fluid containing the oxide raw material liquid and the fluid containing the oxide precipitation solvent.

A method of modifying a functional group contained in the silicon compound coated oxide particle of the present invention is not particularly limited. The silicon compound coated oxide particles may be dispersed in a desired solvent, and a substance containing a functional group may be added to the dispersion, and the mixture may be subjected to a treatment such as stirring. A fluid containing the silicon compound coated oxide particles and a fluid containing a substance containing a functional group may be mixed using a microreactor described in Patent Literature 6 or 7.

The substance containing a functional group is not particularly limited. The substance is a substance containing a functional group substitutable with a hydroxyl group contained in the oxide particle, and includes an acylating agent such as acetic anhydride and propionic anhydride; a methylating agent such as dimethyl sulfurate and dimethyl carbonate; a silane coupling agent such as chlorotrimethylsilane, methyltrimethoxysilane, and the like. Specifically, when using a substance containing a functional group substitutable with a hydroxyl group, a ratio of Si—OH bonds can be controlled. A substance containing a CF bond for introducing CF bonds into silicon compound coated oxide particles includes various fluorinating compounds. Examples of the fluorinating compound include, but are not limited to, a fluorine containing compound such as trifluoroacetic acid and trifluoromethanesulfonic acid, or an anhydride thereof; a fluorine containing silane coupling agent such as triethoxy-1H, 1H, 2H, 2H-heptadecafluorodecylsilane and trimethoxy(3,3,3-trifluoropropyl)silane; or a fluorine compound such as trifluoromethane and trifluoroethane, and these listed fluorinating compounds are preferable because a trifluoromethyl group ($CF_3$ group) is included. CF bonds may be imparted by reacting the fluorinating compound with a hydroxyl group contained in the silicon compound coated oxide particles. Also silicon compound coated oxide particles containing CF bonds may be prepared by reacting the fluorinating compound at the time of precipitating the silicon compound coated oxide particles. Further, the silicon compound coated oxide particles of the present invention may be prepared by a method of reacting a gas such as trifluoromethane and trifluoroethane with silicon compound coated oxide particles or silicon compound coated oxide particles having CF bonds already. And a ratio of Si—OH bonds or a ratio of CF bonds/Si—OH bonds contained in the silicon compound coated oxide particles can be controlled.

As described above, a ratio of Si—OH bonds or a ratio of CF bonds/Si—OH bonds can also be controlled by a method of reacting hydrogen peroxide or ozone with the oxide particles. A method of reacting hydrogen peroxide or ozone with the oxide particles is not particularly limited. The silicon compound coated oxide particles may be dispersed in a desired solvent, and hydrogen peroxide or ozone or a solvent such as water containing it may be added to the dispersion, and the mixture may be subjected to a treatment such as stirring. A fluid containing the silicon compound coated oxide particles and a fluid containing hydrogen peroxide or ozone may be mixed using a microreactor described in Patent Literature 6 or 7.

The dispersion may be a liquid dispersion in which the silicon compound coated oxide particles are dispersed in a liquid dispersion medium such as water, an organic solvent and a resin, or a coating film like dispersion prepared by using a dispersion containing the silicon compound coated oxide particles. In a heat treatment in the state of a dispersion containing the silicon compound coated oxide particles, aggregation of the particles can be suppressed as compared with a dry heat treatment. In the case that the silicon compound coated oxide particles of the present invention are used, for example, in the multilayer coating film and the highly designed multilayer coating film described in JP 2014-042891 and JP 2014-042892, wettability such as water repellency, oil repellency or hydrophilicity and color characteristics of the silicon compound coated oxide particles can be controlled by controlling the ratio of CF bonds or the ratio of CF bonds/Si—OH bonds contained in the oxide particles by a heat treatment or the like after preparation of the multilayer coating film and the highly designed multilayer coating film from the silicon compound coated oxide particles. Therefore, it is suitable for reduction of number of steps, and control of water repellency or oil repellency to a water resistant body or glass, and strict control of color characteristics. Incidentally, the multilayer coating film and the highly designed multilayer coating film described in JP 2014-042891 and JP 2014-042892, achieve a sense of depth and denseness by increasing difference between highlight and shade for a specific color, thereby varying reflected lights greatly depending on an observation angle. Therefore, enhancement of a transmittance for a specific color for raising highlight, and increase of difference between highlight and shade, are required. Especially, in a coating film containing a substance having a ultraviolet shielding property such as the silicon compound coated oxide, for example, a clear coating film, when a molar absorption coefficient in the ultraviolet region, being a ultraviolet absorption ability of the silicon compound coated oxide particles increases, a transparency of the coating film as the oxide particle dispersion will be enhanced. Further, a haze value can be reduced by lowering an amount of usage of the silicon compound coated oxide particles.

In addition to application of the above multilayer coating film, for example, even in a film like composition used as a glass of a building or the like, the silicon compound coated oxide particles can be suitably used for ultraviolet absorption or near infrared reflection by dispersing the silicon compound coated oxide particles in a glass, resin, or the like. Further, the silicon compound coated oxide particles can be suitably used as a silicon compound coated oxide composition for ultraviolet protection or near infrared protection because a transmission property for the visible light can be enhanced. Similarly to the above multilayer coating film, water repellency, oil repellency or hydrophilicity and color characteristics of the silicon compound coated oxide particles can be controlled by controlling the ratio of CF bonds or the ratio of CF bonds/Si—OH bonds contained in the silicon compound coated oxide particles by a modification treatment of a functional group by a heat treatment, fluorinating treatment or the like after the silicon compound coated oxide particles are dispersed in a glass, transparent resin or the like to form a film. Therefore, similarly to the above multilayer coating film, it is suitable for reduction of number of steps, and strict control of water repellency or oil repellency and color characteristics.

Preferable Embodiment-1 of Silicon Compound Coated Oxide Particles

In the present invention, a primary particle diameter of the metal oxide in the silicon compound coated oxide particles is preferably 1 nm or more and 100 nm or less, more preferably 1 nm or more and 50 nm or less. A primary particle diameter of the silicon compound coated oxide particle is also preferably 1 nm or more and 100 nm or less, and more preferably 1 nm or more and 50 nm or less. It is assumed that by existence of CF bonds or Si—OH bonds contained in the silicon compound coated oxide particles mainly on a surface of the particles, wettability such as water repellency, oil repellency or hydrophilicity and color characteristics can be strictly controlled, and that the silicon compound coated oxide particles having a primary particle diameter of 100 nm or less have surface areas greater than the silicon compound coated oxide particles having a primary particle diameter of more than 100 nm. Thereby, it is understood that control of a ratio of Si—OH bonds or a ratio of CF bonds/Si—OH bonds of the silicon compound coated oxide particles greatly affects wettability such as water repellency, oil repellency or hydrophilicity and color characteristics such as a transmission property, absorption property, reflection property, hue and chroma and the like of the silicon compound coated oxide particles. Therefore, in the silicon compound coated oxide particles having a primary particle diameter of 100 nm or less, it is an advantage that predetermined color characteristics (particularly suitable color characteristics for use as a composition for use in a coating film, or coated body, a composition for textile applications such as clothing or the like, or a coated body required to have transparency, a glass, a transparent resin or a film like composition) can be exerted by controlling a ratio of Si—OH bonds or a ratio of CF bonds/Si—OH bonds contained in the silicon compound coated oxide particles.

Preferable Embodiment-2 of Silicon Compound Coated Oxide Particles

In the present invention, in the silicon compound coated oxide particles, it is preferable that the average primary particle diameter of the silicon compound coated oxide particles after coating by the compound is 100.5% or more and 190% or less relative to the average primary particle diameter of the metal oxide particles before coating. When the compound coating on the metal oxide particles is too thin, the effects regarding water repellency or oil repellency and color characteristics of the silicon compound coated oxide particles and the like may not exhibit. Thus, it is preferable that the average primary particle diameter of the silicon compound coated oxide particles after coating by the silicon compound is not less than 100.5% relative to the average primary particle diameter of the metal oxide particles. When the coating is too thick, or when a coarse aggregate is coated, control of water repellency or oil repellency and color characteristics is difficult. Thus, it is preferable that the average primary particle diameter of the silicon compound coated oxide particles after coating by the silicon compound is not more than 190% relative to the average primary particle diameter of the oxide particles. The silicon compound coated oxide particles coated with a silicon compound of the present invention may be core/shell type silicon compound coated oxide particles in which the entire surface of the core metal oxide particle is uniformly coated with the compound. The silicon compound coated oxide particles are preferably silicon compound coated oxide particles in which a plurality of the metal oxide particles are not aggregated and at least a part of the surface of a single metal oxide particle is coated with the compound. But, the silicon compound coated oxide particles may be silicon compound coated oxide particles in which at least a part of the surface of an aggregate in which a plurality of metal oxide particles are aggregated, is coated with the compound.

Preferable Embodiment-3 of Silicon Compound Coated Oxide Particles

A compound coating at least a part of a surface of the oxide of the present invention is preferably a silicon compound, and more preferably a compound containing a silicon oxide, and further preferably a compound containing an amorphous silicon oxide. By containing the amorphous silicon oxide as the silicon compound, color characteristics such as reflectivity, transmittance, a molar absorption coefficient, hue, chroma and the like of the silicon compound coated oxide particles can be controlled more strictly. In the case where the silicon compound is a crystalline silicon oxide, it is very difficult to make Si—OH be present, so that it may be difficult to control color characteristics of the present invention in some cases.

(Method of Producing Silicon Compound Coated Oxide Particles: Preferable Method)

As an example of a method of producing silicon compound coated oxide particles of the present invention, it is preferable to use a method of producing the silicon compound coated oxide particles by providing an oxide raw material liquid containing at least a raw material of metal oxide particles to be coated with a silicon compound and an oxide precipitation solvent containing at least an oxide precipitation substance for precipitating metal oxide particles; and precipitating metal oxide particles by a method such as a reaction, crystallization, precipitation and coprecipitation, in a mixed fluid in which the oxide raw material liquid and the oxide precipitation solvent are mixed; and coating at least a part of the surface of the metal oxide particle with a silicon compound being a coating compound by mixing the mixed fluid containing the precipitated metal oxide particles with a silicon compound raw material liquid containing at least a raw material of the silicon compound. In order to prepare silicon compound coated oxide particles for coloring, a plurality of different metal elements or metalloid elements contained in the metal oxide particles, may be contained together in the oxide raw material liquid, or may be contained in the oxide raw material liquid and the oxide precipitation solvent respectively, or may be contained in both of the oxide raw material liquid and the oxide precipitation solvent or the silicon compound raw material liquid.

A raw material of silicon compound coated oxide particles of the present invention is not particularly limited. Any substances can be used as long as the substances become silicon compound coated oxide particles in a manner such as a reaction, crystallization, precipitation, coprecipitation or the like. In the present invention, hereinafter, a compound of a metal element or metalloid element is referred to as a compound. The compound is not particularly limited, but includes, for example, a salt, an oxide, a hydroxide, a hydroxide oxide, a nitride, a carbide, a complex, an organic salt, an organic complex, an organic compound of the metal or metalloid including a metal element or metalloid element, or a hydrate thereof, an organic solvate thereof, and the like. It is also possible to use a simple substance of a metal element or metalloid element. A metal salt or metalloid salt is not particularly limited, but includes a nitrate, a nitrite, a sulfate, a sulfite, a carbonate, a formate, an acetate, a phosphate, a phosphite, a hypophosphite, a chloride, an oxy salt, an acetylacetonate of the metal or metalloid, or a hydrate thereof, an organic solvate thereof and the like. An organic compound includes a metal alkoxide, a metalloid alkoxide, and the like. These metal compound or metalloid compound may be used alone, or a mixture of a plurality of these compounds may be used as a raw material of oxide particles. In the present invention, when a metal oxide constituting the silicon compound coated oxide particles is a plurality of different metal elements or metalloid elements, a molar ratio of M2 to M1 (M2/M1) constituting the M2 doped oxide particles is preferably 0.01 or more and 1.00 or less, wherein M1 is the main metal element and M2 is the subordinate metal element or metalloid element.

A raw material of the silicon compound includes a silicon oxide, a silicon hydroxide, other compounds such as a silicon salt and a silicon alkoxide, and a hydrate thereof. Not particularly limited, it includes a silicate such as sodium silicate, phenyltrimethoxysilane, methyltrimethoxysilane, methyltriethoxysilane, 3-glycidoxypropyltrimethoxysilane, 3-trifluoropropyl-trimethoxysilane, methacryloxypropyltriethoxysilane, tetramethoxysilane (TMOS), tetraethoxysilane (TEOS), and an oligomeric condensate of TEOS, for example, ethyl silicate 40, tetraisopropylsilane, tetrapropoxysilane, tetraisobutoxysilane, tetrabutoxysilane, and a similar material thereof. Further as a raw material of silicon oxide, another siloxane compound, bis(triethoxysilyl)methane, 1,9-bis(triethoxysilyl)nonane, diethoxydichlorosilane, triethoxychlorosilane and the like may be used. These are not used only for coating surfaces of the particles, but also can be used as compounds containing the M1 or M2.

Further, when a raw material of the metal oxide particles or a raw material of a silicon compound for coating is a solid, it is preferable to use each raw material in a molten state, or in a state of being mixed or dissolved in a solvent described below, including a dispersion state. Even when each raw material is a liquid or gas, it is preferable to use it in a state of being mixed or dissolved in a solvent described below, including a dispersion state.

An oxide precipitation substance is not particularly limited as long as the substance can make a raw material of the silicon compound coated oxide particles contained in an oxide raw material liquid be precipitated as silicon compound coated oxide particles. For example, an acidic substance or a basic substance may be used. It is preferable to use an oxide precipitation substance at least in the state that the substance is mixed, dissolved or molecularly dispersed in a solvent described below.

A basic substance includes a metal hydroxide such as sodium hydroxide and potassium hydroxide, a metal alkoxide such as sodium methoxide and sodium isopropoxide, an amine compound such as triethylamine, diethylaminoethanol and diethylamine, ammonia and the like.

An acidic substance includes an inorganic acid such as aqua regia, hydrochloric acid, nitric acid, fuming nitric acid, sulfuric acid, fuming sulfuric acid, and an organic acid such as formic acid, acetic acid, chloroacetic acid, dichloroacetic acid, oxalic acid, trifluoroacetic acid, trichloroacetic acid, citric acid and the like. The basic substance and the acidic substance can also be used for precipitating silicon compound coated oxide particles or a compound for coating.

(Solvent)

A solvent used in preparation of an oxide raw material liquid, an oxide precipitation solvent and a silicon compound raw material liquid, includes, for example, water, an organic solvent, or a mixed solvent of a plurality of these solvents. The water includes tap water, ion exchange water, pure water, ultrapure water, RO water (reverse osmosis water) and the like. The organic solvent includes, an alcohol solvent, an amide solvent, a ketone solvent, an ether solvent, an aromatic compound solvent, carbon disulfide, an aliphatic compound solvent, a nitrile solvent, a sulfoxide solvent, a halogen compound solvent, an ester solvent, an ionic liquid, a carboxylic acid compound, a sulfonic acid compound and the like. Each of the solvents may be used alone, or a plurality of them may be mixed and used. An alcohol solvent includes a monohydric alcohol such as methanol and ethanol, a polyol such as ethylene glycol and propylene glycol, and the like.

(Dispersing Agent and the Like)

Various dispersing agents or surfactants may be used depending on a purpose or necessity, as long as they do not adversely affect production of the silicon compound coated oxide particles of the present invention. Not particularly limited, as a dispersing agent or a surfactant, various generally used commercial products or products, and newly synthesized products and the like may be used. As an example, a dispersing agent such as an anionic surfactant, a cationic surfactant, a nonionic surfactant, and various polymers and the like may be used. These may be used alone or two or more thereof may be used in combination. The surfactant and dispersing agent may be contained in at least one fluid of the oxide raw material liquid and oxide precipitation solvent. In addition, the surfactant and dispersing agent may be contained in another fluid different from the oxide raw material liquid and oxide precipitation solvent.

(Method of Producing Silicon Compound Coated Oxide Particles: Method Outline-1)

In the present invention, firstly, metal oxide particles coated with the silicon compound are produced by precipitation or the like as described above. In this case, when the metal oxide particles are composed of a plurality of different elements M1 and M2, at least both M1 and M2 are preferably present inside the particles. In producing metal oxide particles composed of a plurality of different metal elements or metalloid elements by precipitation or the like, it is preferable to produce them by precipitating metal oxide particles composed of a plurality of different elements (M1 and M2) at substantially the same time. For example, in the case that silicon compound coated oxide particles are precipitated by mixing an oxide raw material obtained by dissolving a zinc compound (M1=Zn) such as zinc nitrate hexahydrate as a raw material of zinc oxide and a compound containing a metallic element or metalloid element (M2) for forming a composite oxide in an acidic aqueous solution, with an oxide precipitation solvent which is an aqueous solution of an alkali metal hydroxide (oxide precipitation substance) such as sodium hydroxide, it is necessary to precipitate silicon compound coated oxide particles by mixing the oxide precipitation solvent having pH of 14 or more, to the oxide raw material liquid pH of about 1 to 2, preferably less than 1. Oxides composed of M1 or M2 contained in the oxide raw material liquid have respective different pHs, temperatures and the like suitable for their precipitation. For example, in the case that a basic oxide precipitation solvent is gradually added to an acidic oxide raw material liquid, pH of the mixed liquid of the oxide raw material liquid and the oxide precipitation solvent gradually changes from acidic to basic, and at first when the pH becomes close to the pH at which either one of M1 and M2 tends to precipitate, an oxide of the one of M1 or M2 precipitates or begins to precipitate, and later when the pH of the mixed liquid changes to the basic side by further adding the oxide precipitation solvent, the other oxide different from the earlier precipitated oxide precipitates. It may be understood that oxide particles composed of M1 and oxide particles composed of M2 precipitate step by step as explained above. In that case, it is difficult to prepare the metal oxide particles containing both M1 and M2 inside the particles. By instantaneously adjusting the pH of the mixed liquid to a pH at which both the oxide of M1 and the oxide of M2 precipitate, the apparent precipitation can be made simultaneously, so that at least premise conditions for producing the metal oxide particles containing both M1 and M2 inside the particles can be arranged.

(Method of Producing Silicon Compound Coated Oxide Particles: Method Outline-2)

Further, in the step of coating at least a part of a surface of the metal oxide particles with a silicon compound, it is preferable to coat with the silicon compound before the metal oxide particles aggregate. When a silicon compound raw material liquid is mixed with a fluid containing the metal oxide particles, it is important that after precipitating the metal oxide particles, the silicon compound precipitates on the surface of the metal oxide particles by adding the silicon compound raw material liquid at a rate faster than aggregation occurs. Furthermore, by introducing the silicon compound raw material liquid into the fluid containing the metal oxide particles, pH of the fluid containing the metal oxide particles and a concentration of the silicon compound raw material gradually change. If the silicon compound for coating the surface of the particles precipitates after an easily dispersible state is changed to an easily aggregating state, there is a possibility that it becomes difficult to coat before aggregation and the characteristics of the present invention cannot be exhibited. It is preferable to actuate the silicon compound raw material contained in the silicon compound raw material liquid immediately after the metal oxide particles precipitate.

(Correspondence Relation with Priority Claimed Application)

The inventors of the present application have found that by controlling a ratio of Si—OH bonds or a ratio of CF bonds/Si—OH bonds contained in the silicon compound coated oxide particles, wettability such as water repellency, oil repellency or hydrophilicity, and color characteristics can be controlled, and has accomplished the present inventions. JP application 2016-111346, a priority claimed application of the present application, discloses silicon compound coated oxide particles wherein the silicon compound is a silicon oxide; and utilization of a substance containing a CF bond such as trifluoroacetic acid for imparting CF bonds to the silicon compound coated oxide particles at precipitation of the silicon compound coated oxide particles, and 3-trifluoropropyl-trimethoxysilane as an oxide raw material for shell; and that the particles have unique properties. As disclosed in PCT/JP2016/83001, another priority claimed application of the present application, the inventors of the present invention further discovered that by controlling Si—OH bonds contained in the silicon compound coated oxide particles, water repellency or oil repellency and color characteristics of the silicon compound coated oxide particles can be controlled. The silicon compound coated oxide particles of the present invention substantially correspond to the silicon compound coated oxide particles disclosed in JP 2016-111346, a priority claimed application of the present application.

(Method of Producing Silicon Compound Coated Oxide Particles: Apparatus)

Figure 4:
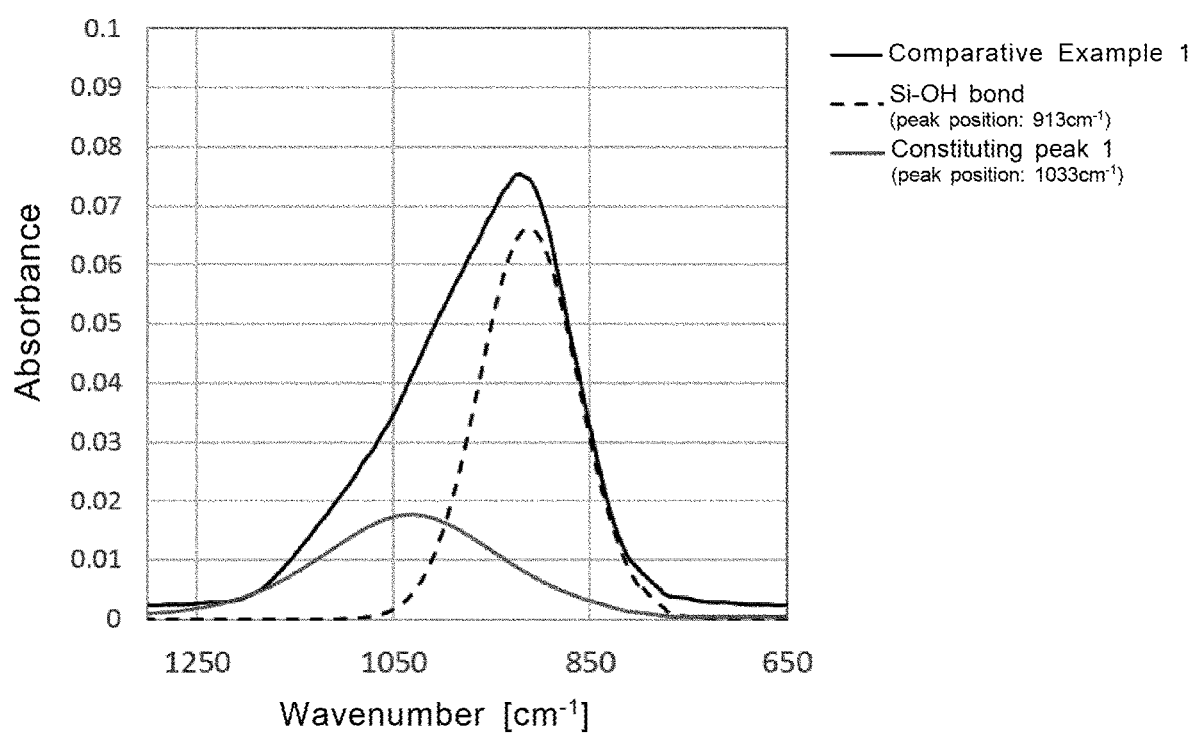
FIG. 4 shows a result of waveform separation of the IR measurement result of the silicon compound coated zinc oxide particles obtained in Comparative Example 1 between wavenumbers 650 $cm^{-1}$ and 1,300 $cm^{-1}$.
Figure 5:
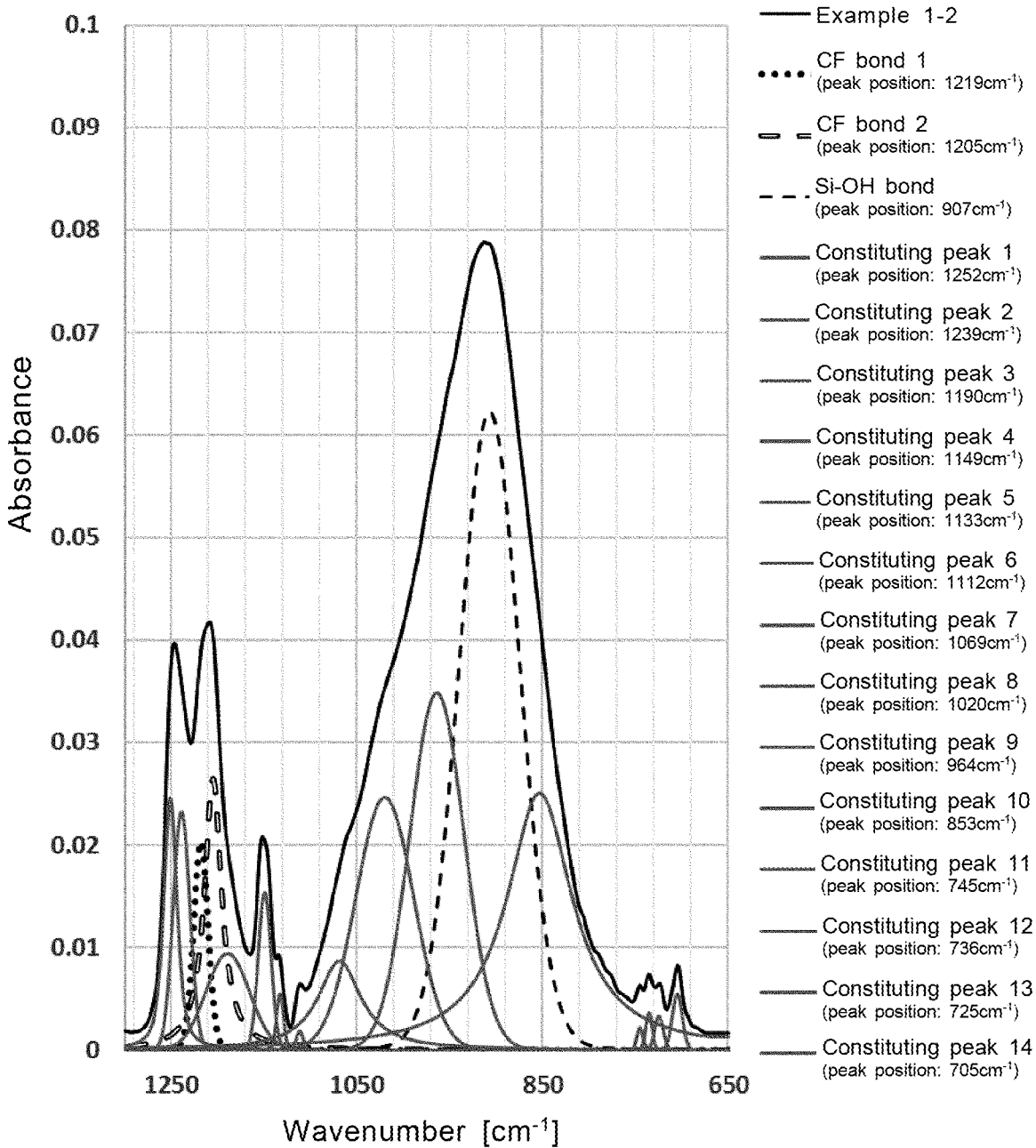
FIG. 5 shows a result of waveform separation of the IR measurement result of the silicon compound coated zinc oxide particles obtained in Example 1-2 between wavenumbers 650 $cm^{-1}$ and 1,300 $cm^{-1}$.

A method of producing the silicon compound coated oxide particles of the present invention includes, for example, a method of producing the silicon compound coated oxide particles by using a microreactor, or by a reaction in a dilute system in a batch vessel or the like, and the like. The apparatus and method as proposed by the present applicant and described in JP 2009-112892 may be also used for producing the silicon compound coated oxide particles. The apparatus described in JP 2009-112892 comprises a stirring tank having an inner peripheral surface which cross-section is circular, and a mixing tool attached to the stirring tank with a slight gap to the inner peripheral surface of the stirring tank, wherein the stirring tank comprises at least two fluid inlets and at least one fluid outlet; from one of the fluid inlets, the first fluid to be processed containing one of the reactants among the fluids to be processed is introduced into the stirring tank; from one fluid inlet other than the above inlet, the second fluid to be processed containing one of reactants different from the above reactant is introduced into the stirring tank through a different flow path; at least one of the stirring tank and the mixing tool rotates at a high speed relative to the other to let the above fluids be in a state of a thin film; and in the above thin film, the reactants contained in the first and second fluids to be processed are reacted. JP 2009-112892 further describes that three or more inlet tubes may be provided as shown in FIGS. 4 and 5 to introduce three or more fluids to be processed into the stirring tank. As an example of the microreactor, an apparatus using the same principle as the fluid processing apparatus described in Patent Literatures 6 and 7 can be used. Alternatively, metal oxide particles may be prepared by using a pulverization method such as a beads mill and the like, and then a process of coating oxide particles with a silicon compound may be performed in a reaction vessel or the microreactor described above or the like.

(Silicon Compound Coated Oxide Particle Composition-1)

The silicon compound coated oxide particles of the present invention is intended for wettability such as water repellency, oil repellency, hydrophilicity and the like, and protection of ultraviolet rays or near infrared rays, and coloring. The silicon compound coated oxide particles may be used as a composition for use in a coating film, sealing material or coated body, a composition for textile applications such as clothing or the like, or a coated body required to have transparency, a glass, a transparent resin or a film like composition. As one example, the silicon compound coated oxide particles may be used for a composition for coloring or a composition for a transparent material. The composition for coating is not particularly limited, and examples thereof include a composition for coating for use in various paints such as a solvent based paint and water based paint, and a composition for coating intended for a cosmetic such as a lipstick and foundation, sunscreen and the like, or for application to a skin. The composition for a transparent material includes a composition for use in a coated body required to have transparency, a glass for use in a building or vehicle or a glass for eyeglasses, a transparent resin or a film like composition, and a composition contained in a glass, transparent resin or clear coating film, a composition contained in an intermediate film of a combined glass, a film like composition used for a film combined with a glass, such as one attaching to a glass or transparent resin, a paint for coating on a glass, and the like. The above transparent resin includes PMMA (polymethyl methacrylate), PC (polycarbonate), PET (polyethylene terephthalate), and the like.

(Silicon Compound Coated Oxide Particle Composition-2)

When used as a paint, coating film, a cosmetic or the like, or a material of a glass or transparent resin of a composition for coating or a composition for a transparent material, the silicon compound coated oxide particle composition of the present invention can be used by a method of mixing the silicon compound coated oxide particle composition of the present invention to a composition such as a coating film forming a paint or coated body or a cosmetic or the like, or a method of directly kneading them to a glass or pre-hardened glass or clear resin, or a method of mixing them in a film for various glasses or a composition for forming a clear coating film. Thereby, a composition for coating for ultraviolet or near infrared protection suitable for effectively shielding ultraviolet rays or near infrared rays according to the purpose, and having controlled wettability such as water repellency, oil repellency, hydrophilicity and the like, or a composition for a transparent material for ultraviolet or near infrared protection having controlled wettability such as water repellency, oil repellency, hydrophilicity and the like, can be obtained. The composition for coating for ultraviolet or near infrared protection or the composition for a transparent material for ultraviolet or near infrared protection, if necessary, may further comprise an additive such as a pigment, dye, wetting agent, dispersing agent, color separation inhibitor, leveling agent, viscosity modifier, anti-skinning agent, anti-gelling agent, antifoaming agent, thickener, anti-sagging agent, antifungal agent, ultraviolet absorber, film-forming assistant agent, surfactant, resin component, if necessary, depending on its purpose. A resin component for painting purpose includes a polyester resin, melamine resin, phenol resin, epoxy resin, vinyl chloride resin, acrylic resin, urethane resin, silicone resin, fluorine resin and the like. A coating material which a paint containing the silicon compound coated oxide particles of the present invention is applied to, may be a single layer coating material composed of a single composition for coating, or a multilayer coating material composed of a plurality of a composition for coating such as laminated coating film as described in JP 2014-042891 or JP 2014-042892. The coating material may be performed by adding it to a paint containing a pigment, or to a paint such as a clear paint. In the case where the above film like composition is aimed, if necessary, a binder resin, curing agent, curing catalyst, leveling agent, surfactant, silane coupling agent, defoaming agent, coloring agent such as a pigment or dye, antioxidant and the like may be contained.

(Composition for Coating or Composition for a Transparent Material-3)

The composition for coating for ultraviolet or near infrared protection or the composition for a transparent material for ultraviolet or near infrared protection having controlled wettability such as water repellency, oil repellency, hydrophilicity and the like of the present invention, comprises powers of silicon compound coated oxide particles; a dispersion wherein silicon compound coated oxide particles are dispersed in a liquid dispersion medium; and a dispersion wherein silicon compound coated oxide particles are dispersed in a solid such as a glass and resin, and the like. The silicon compound coated oxide particles contained in the above composition may be composed of one silicon compound coated oxide particle, or may be composed of an aggregate of a plurality of silicon compound coated oxide particles, or may be composed of both of those. When the silicon compound coated oxide particles are composed of an aggregate of a plurality of the silicon compound coated oxide particles, a size of the aggregate is preferably 100 nm or less. Further, the composition for coating for ultraviolet or near infrared protection or the composition for a transparent material for ultraviolet or near infrared protection may be used together with various coloring materials, or may be a composition for overcoating on a glass as a coating film. Further, in the case where the composition for coating for ultraviolet or near infrared protection or the composition for a transparent material for ultraviolet or near infrared protection having controlled wettability such as water repellency, oil repellency, hydrophilicity and the like, is a dispersion, a dispersion medium includes water such as tap water, distilled water, RO water (reverse osmosis water), pure water and ultrapure water; an alcohol solvent such as methanol, ethanol and isopropyl alcohol; a polyhydric alcohol solvent such as propylene glycol, ethylene glycol, diethylene glycol and glycerine; an ester solvent such as ethyl acetate and butyl acetate; an aromatic solvent such as benzene, toluene and xylene; a ketone solvent such as acetone and methyl ethyl ketone; a nitrile solvent such as acetonitrile; silicone oil, a vegetable oil, a wax and the like. These may be used alone or two or more thereof may be used in combination.

(Color of Composition for Coating or Composition for a Transparent Material)

A color of a coating material used for the composition for coating for ultraviolet or near infrared protection or the composition for a transparent material for ultraviolet or near infrared protection having controlled wettability such as water repellency, oil repellency, hydrophilicity and the like of the present invention, or a transparent material such as a film, glass and the like used for the composition for a transparent material for ultraviolet or near infrared protection, is not particularly limited. The composition for coating for ultraviolet or near infrared protection or the composition for a transparent material for ultraviolet or near infrared protection of the present invention can be used for a desired hue. Further, since the silicon compound coated oxide particles of the present invention can strictly and accurately control color characteristics by controlling the ratio of Si—OH bonds or the ratio of CF bonds/Si—OH bonds, the silicon compound coated oxide particles are also suitable for use as a composition for coloring for ultraviolet or near infrared protection. The composition for coating, for a transparent material or for coloring of the present invention contains the silicon compound coated oxide particles, so that wettability such as water repellency, oil repellency, hydrophilicity and the like can be controlled, and ultraviolet or near infrared protection ability can be increased when the composition is used as a paint or coated material such as a coated body used for a building, vehicle, etc., or when the composition is used for as a transparent material of a film like composition such as a clear coating film or a glass or a display or a contact lens; for a coated body such as a building and vehicle, in addition to control of the wettability, decomposition of an organic substance contained in the coated body, or damages of a skin in a human body and the like can be suppressed; for a glass used for a building or vehicle and the like, in addition to control of the wettability, damages of an organic compound and equipment in a room by ultraviolet rays transmitted through the glass can be suppressed; temperature rise by near infrared rays can be suppressed; in addition, improvement of transparency of a glass, clear coating film and the like can be contributed due to reduction of an amount of usage and thereby high transmission characteristics; and, the aesthetic appearance, texture or designability can be enhanced due to strict control of color characteristics such as a hue.

(Color of Composition for Coating, Composition for a Transparent Material or Composition for Coloring)

Colors of the coating material or transparent material include a white color, gray color or black color such as color of white color of a lightness of 10 to black color of a lightness 0 in the Munsell color system, a red color such as color having a hue from RP to YR in the Munsell hue circle; a yellow to green color such as a color having a hue from Y to BG in the Munsell hue circle; a blue to purple color such as a color having a hue from B to P in the Munsell hue circle (each of these colors includes a metallic color), and the like.

These colors may be preferably blended to a composition for coating used for a coating material having these colors. However, the present invention is not limited to these colors, and may be a color of any other hues. In addition, by using a composition for coating or a composition for a transparent material containing the silicon compound coated oxide particles of the present invention to a top coat of a coating film or coated body exhibiting these colors, various compositions with controlled wettability such as water repellency, oil repellency, hydrophilicity and the like can be obtained, impairment of coloring of each color can be remarkably reduced, and effective coloring is also possible, so that it is also suitable as a composition for coloring for enhancing designability of a coated body. As a pigment or dye optionally included in a composition for coating, a transparent material or coloring, various pigments and dyes may be used, and for example, all pigments and dyes registered in the color index may be used. Among these colors, a pigment or dye constituting a pigment constituting a green color includes, for example, a pigment or dye classified into C. I. Pigment Green; a pigment constituting a blue color includes, for example, a pigment or dye classified into C. I. Pigment Blue; a pigment constituting a white color includes, for example, a pigment or dye classified into C. I. Pigment White; a pigment constituting a yellow color includes, for example, a pigment or dye classified into C. I. Pigment Yellow; a red color includes, for example, a pigment or dye classified into C. I. Pigment Red in the Color Index, a pigment or dye classified into C. I. Pigment Violet or C. I. Pigment Orange in the Color Index, and the like. More specific examples include a quinacridone pigment such as C. I. Pigment Red 122 and C. I. Violet 19; a diketopyrrolopyrrole pigment such as C. I. Pigment Red 254 and C. I. Pigment Orange73; a naphthol pigment such as C. I. Pigment Red 150 and C. I. Pigment Red 170; a perylene pigment such as C. I. Pigment Red 123 and C. I. Pigment Red 179; and an azo pigment such as C. I. Pigment Red 144, and the like. These pigments and dyes may be used alone, or a plurality of these may be mixed and used. The composition comprising the silicon compound coated oxide particles of the present invention may be also mixed in a composition for coating, a transparent material or coloring alone without mixing with the above pigments and dyes and the like.

EXAMPLE

Hereinafter, the present invention is explained in more detail with reference to examples, but the present invention is not limited only to these examples. Pure water having conductivity of 0.86 µS/cm (measurement temperature: 25° C.) was used for pure water in the following examples, unless otherwise noted.

(Preparation of TEM Observation Sample and Preparation of STEM Observation Sample)

A part of the wet cake samples of the silicon compound coated oxide particles obtained in Examples was dispersed in propylene glycol monomethyl ether, and the resulting dispersion was dropped to a collodion membrane, and dried to prepare a TEM observation sample or an STEM observation sample. In the case of the silicon compound coated oxide particles obtained in Comparative Examples described below, a part of the wet cake samples of the obtained silicon compound coated oxide particles was dispersed in propylene glycol, and further was diluted to 100 fold by isopropyl alcohol (IPA). The resulting diluted liquid was dropped to a collodion membrane, and dried to prepare a TEM observation sample or an STEM observation sample.

(Transmission Electron Microscopy and Energy Dispersive X-ray Analyzer: TEM-EDS Analysis)

For observation and quantitative analysis of the silicon compound coated oxide particles by TEM-EDS analysis, the transmission electron microscopy JEM-2100 (JEOL Ltd.) equipped with the energy dispersive X-ray analyzer JED-2300 (JEOL Ltd.) was used. The observation condition was the acceleration voltage of 80 kV, and the observation magnification of 25,000 times or more. The particle diameters were calculated from the maximum distance between two points on the outer periphery of the silicon compound coated oxide particles observed by TEM, and the average value of the measured particle diameters of 100 particles (average primary particle diameter) was calculated. A molar ratio of the elemental components contained in the silicon compound coated oxide was calculated by TEM-EDS, and the average value of the results of calculated molar ratio for 10 or more particles was calculated.

(Scanning Transmission Electron Microscopy and Energy Dispersive X-ray Analyzer: STEM-EDS Analysis)

For the mapping and quantification of elements contained in the silicon compound coated oxide particles by STEM-EDS analysis, the atomic resolution analytical electron microscopy JEM-ARM200F (JEOL Ltd.) equipped with the energy dispersive X-ray analyzer Centurio (JEOL Ltd.) was used. The observation condition was the acceleration voltage of 80 kV and the observation magnification of 50,000 times or more, and a beam diameter of 0.2 nm was used for analysis.

(X-ray Diffraction Measurement)

For the X-ray diffraction (XRD) measurement, the powder X-ray diffractometer Empyrean (Spectris Co., Ltd., PANalytical Division) was used. The measurement condition was measurement range of 10 to 100 [° 2Theta], Cu anticathode, tube voltage of 45 kV, tube current of 40 mA, and scanning speed of 0.3°/min. The XRD was measured using the dry powders of the silicon compound coated oxide particles obtained in Examples and Comparative Examples.

(FT-IR Measurement)

For the FT-IR measurement, the Fourier transform infrared spectrophotometer FT/IR-6600 (JASCO Corporation) was used. The measurement condition was the resolution of 4.0 cm$^{-1}$ and accumulated number of 1,024 times, using an ATR method under a nitrogen atmosphere. Waveform separation of peaks in the wavenumbers of 650 cm$^{-1}$ to 1,300 cm$^{-1}$ in the IR spectrum was processed by curve-fitting such that a residual square sum is 0.01 or less, using the spectral analysis program attached to the control software of FT/IR-6600. The FT-IR was measured using the dry powders of the silicon compound coated oxide particles obtained in Examples and Comparative Examples.

(Transmission Spectrum, Absorption Spectrum, Reflection Spectrum, Hue and Chroma)

Transmission spectrum, absorption spectrum, reflection spectrum, hue, and chroma were measured by ultraviolet visible near infrared spectroscopy (product name: V-770, JASCO Corporation). Measurement range of transmission spectrum was 200 nm to 800 nm, and measurement range of absorption spectrum was 200 nm to 800 nm, the sampling rate was 0.2 nm, and the measurement speed was low speed. The transmittances at a plurality of measurement wavelengths in a specific wavelength range were simply averaged to obtain average transmittance.

After measuring absorption spectrum, a molar absorption coefficient at each measurement wavelength was calculated from the absorbance obtained from the measurement result and the concentration of the oxide particles in the dispersion, and the graph was prepared showing the measurement wavelength on the horizontal axis and the molar absorption coefficient on vertical axis. A liquid cell of thickness of 1 cm was used for measurements. Also, the molar absorption coefficients measured at a plurality of wavelengths from 200 nm to 380 nm were simply averaged to obtain an average molar absorption coefficient.

Measurement range of reflection spectrum was 200 to 2,500 nm, and the sampling rate was 2.0 nm, and the measurement speed was medium speed, and measurement method was a double beam photometry. Total reflection measurement for measuring specular reflection and diffuse reflection was performed. For a background measurement (baseline) in measuring powders, the standard white plate (product name: Spectralon™, Labsphere Inc.) was used. Reflection spectrum was measured using dry powders of the silicon compound coated oxide particles in Examples. Reflectivities at a plurality of measurement wavelengths in a specific wavelength range were simply averaged to obtain an average reflectivity. Hue and chroma were measured from the reflection spectrum measurement result in the L*a*b* color system, in which the field of view was 2 (deg), the light source was D65-2, the color matching function was JIS Z 8701: 1999, and the data interval as 5 nm. Hue and chroma were calculated by the following equations from the obtained values L*, a* and b*: hue H=b*/a*, and chroma C=((a*)$^2$+(b*)$^2$)$^{1/2}$.

Example 1

In the following, Example 1 describes silicon compound coated zinc oxide particles in which at least a part of a surface of a zinc oxide particle as a metal oxide particle is coated with a silicon compound. An oxide precipitation solvent (liquid A), an oxide raw material liquid (liquid B), and a silicon compound raw material liquid (liquid C) were prepared using the high-speed rotary dispersion emulsification apparatus CLEAMIX (product name: CLM-2.2 S, M. Technique Co., Ltd.). Specifically, based on the formulation of the oxide raw material liquid shown in Example 1 of Table 1, the components of the oxide raw material liquid were mixed homogeneously by stirring using CLEARMIX at preparation temperature of 40° C. and at the rotor rotational speed of 20,000 rpm for 30 min to prepare the oxide raw material liquid. Based on the formulation of the oxide precipitation solvent shown in Example 1 of Table 1, the components of the oxide precipitation solvent were mixed homogeneously by stirring using CLEARMIX at preparation temperature of 45° C. and at the rotor rotational speed of 15,000 rpm for 30 min to prepare the oxide precipitation solvent. However, when a single solvent such as methanol (MeOH) alone was used, the above preparation process was not performed. Based on the formulation of the silicon compound raw material liquid shown in Example 1 of Table 1, the components of the silicon compound raw material liquid were mixed homogeneously by stirring using CLEARMIX at preparation temperature of 20° C. and at the rotor rotational speed of 6,000 rpm for 10 min to prepare the silicon compound raw material liquid.

Regarding the substances represented by the chemical formula and abbreviations set forth in Table 1, MeOH is methanol (Godo Co., Ltd.), EG is ethylene glycol (Kishida Chemical Co., Ltd.), KOH is potassium hydroxide (Nippon Soda Co., Ltd.), TEOS is tetraethyl orthosilicate (Wako Pure Chemical Industry Ltd.), ZnO is zinc oxide (Kanto Kagaku Co., Ltd.), $Zn(NO_3)_2 \cdot 6H_2O$ is zinc nitrate hexahydrate (Kanto Kagaku Co., Ltd.), $Co(NO_3)_2 \cdot 6H_2O$ is cobalt nitrate hexahydrate (Kanto Kagaku Co., Ltd.), $Mn(NO_3)_2 \cdot 6H_2O$ is manganese nitrate hexahydrate (Kanto Kagaku Co., Ltd.), $Al(NO_3)_3 \cdot 9H_2O$ is aluminum nitrate nonahydrate (Kanto Kagaku Co., Ltd.), $Fe(NO_3)_3 \cdot 9H_2O$ is iron nitrate nonahydrate (Kanto Kagaku Co., Ltd.), NaOH is sodium hydroxide (Kanto Kagaku Co., Inc.), NMP is N-methyl-2-pyrrolidone (Kishida Chemical Co., Ltd.), fluorinating agent 1 is triethoxy-1H, 1H, 2H, 2H-heptadecafluorodecylsilane (Tokyo Chemical Industry Co., Ltd.), fluorinating agent 2 is trimethoxy-(3,3,3-trifluoropropyl)-silane (Tokyo Chemical Industry Co., Ltd.), fluorinating agent 3 is trifluoroacetic anhydride (Kanto Kagaku Co., Inc.), and fluorinating agent 4 is trifluoromethanesulfonic anhydride (Kanto Kagaku Co., Inc.).

Then, the prepared oxide raw material liquid, the oxide precipitation solvent and the silicon compound raw material liquid were mixed using the fluid processing apparatus described in Patent Literature 7 filed by the present applicant. Here, the fluid processing apparatus described in Patent Literature 7 is an apparatus described in FIG. 1(B) of Patent Literature 7, wherein the openings of the second and third introduction parts have concentric annular shapes which are surrounding the central opening of the processing surface 2 which is a ring-shaped disc, which was used. Specifically, the oxide raw material liquid or the oxide precipitation solvent as liquid A was introduced from the first introduction part d1 into the space between the processing surfaces 1 and 2, and while driving the processing member 10 at a rotational speed of 1,130 rpm, as liquid B the other liquid of the oxide raw material liquid and the oxide precipitation solvent other than the liquid sent as liquid A was introduced from the second introduction part d2 into the space between the processing surfaces 1 and 2, and the oxide raw material liquid and the oxide precipitation solvent were mixed in the thin film fluid, to let the core zinc oxide particles be precipitated in the space between the processing surfaces 1 and 2. Then, the silicon compound raw material liquid as liquid C was introduced from the third introduction part d3 into the space between the processing surfaces 1 and 2, and liquid C was mixed with a mixed fluid containing the core zinc oxide particles in the thin film fluid. The silicon compound was precipitated on the surface of the core zinc oxide particles. The discharge liquid containing the silicon compound coated zinc oxide particles (hereinafter, the silicon compound coated zinc oxide particle dispersion) was discharged from the space between the processing surfaces 1 and 2 of the fluid processing apparatus. The silicon compound coated zinc oxide particle dispersion was collected in the beaker b through the vessel v.

Table 2 shows the operating conditions of the fluid treatment apparatus, and the average primary particle diameters calculated from the TEM observation result of the silicon compound coated zinc oxide particles, and the molar ratios of F/Si/Zn calculated from TEM-EDS analysis, and the calculated values calculated from the formulations and introduction flow rates of liquid A, liquid B and liquid C. However, when core zinc oxide particles are a complex oxide containing a metal element or metalloid element other than zinc for the purpose of coloring, the molar ratio of F/Si/(Zn+M2+M3) is referred to the ratio, wherein M2 and M3 represent the metal element or metalloid element different from zinc. The introduction temperatures (liquid sending temperatures) and the introduction pressures (liquid sending pressures) of liquid A, liquid B and liquid C shown in Table 2 were measured using a thermometer and a pressure gauge provided in a sealed inlet path leading to the space between the processing surfaces 1 and 2 (the first introduction part d1, the second introduction part d2 and the third introduction part d3). The introduction temperature of liquid A shown in Table 2 is the actual temperature of liquid A under the introduction pressure in the first introduction part d1. Similarly, the introduction temperature of liquid B shown in Table 2 is the actual temperature of liquid B under the introduction pressure in the second introduction part d2. The introduction temperature of liquid C shown in Table 2 is the actual temperature of liquid C under the introduction pressure in the third introduction part d3.

For the pH measurement, the pH meter, model number D-51 manufactured by HORIBA Ltd. was used. The pHs of liquid A, liquid B and liquid C were measured at room temperature prior to introduction into the fluid processing apparatus. Further, it is difficult to measure the pH of the mixed fluid immediately after mixing the oxide raw material liquid and the oxide precipitation solvent, and the pH of the mixed fluid immediately after mixing the fluid containing the core zinc oxide particles and the silicon compound raw material liquid. Therefore, the silicon compound coated zinc oxide particle dispersion was discharged from the apparatus and collected in the beaker b, and the pH of the liquid was measured at room temperature.

Dry powders and wet cake samples were produced from the silicon compound coated zinc oxide particle dispersion which was discharged from the fluid processing apparatus, and collected in the beaker b. The manufacturing method was conducted according to a conventional method of this type of processing. The discharged silicon compound coated zinc oxide particle dispersion was collected, and the silicon compound coated zinc oxide particles were settled, and the supernatant was removed. Thereafter, the silicon compound coated zinc oxide particles were washed and settled three times repetitively with 100 parts by weight of pure water, and then, were washed and settled three times repetitively with pure water. A part of the finally obtained wet cake of the silicon compound coated zinc oxide particles was dried at 25° C. at −0.10 MPaG for 20 hours to obtain the dry powders. The rest was the wet cake sample.

TABLE 1

| | | Formulation of the 1st fluid (liquid A) | | | | | |
|---|---|---|---|---|---|---|---|
| | | Formulation | | | | pH | |
| | | Raw material [wt %] | Raw material [wt %] | Raw material [wt %] | Raw material [wt %] | pH | [° C.] |
| Example 1-1 | Oxide precipitation solvent | MeOH [100 wt %] | — | — | — | 6.25 | 20.4 |
| Example 1-2 | Oxide precipitation solvent | MeOH [100 wt %] | — | — | — | 6.25 | 20.4 |
| Example 1-3 | Oxide precipitation solvent | MeOH [100 wt %] | — | — | — | 6.25 | 20.4 |
| Example 1-4 | Oxide precipitation solvent | MeOH [100 wt %] | — | — | — | 6.25 | 20.4 |
| Example 1-5 | Oxide raw material liquid | $Zn(NO_3)_2 \cdot 6H_2O$ [3.00 wt %] | NMP [97.00 wt %] | — | — | — | — |
| Example 1-6 | Oxide raw material liquid | $Zn(NO_3)_2 \cdot 6H_2O$ [3.00 wt %] | NMP [97.00 wt %] | — | — | — | — |
| Example 1-7 | Oxide raw material liquid | $Zn(NO_3)_2 \cdot 6H_2O$ [3.00 wt %] | $Co(NO_3)_2 \cdot 6H_2O$ [0.246 wt %] | — | EG [96.754 wt %] | 4.10 | 22.2 |
| Example 1-8 | Oxide raw material liquid | $Zn(NO_3)_2 \cdot 6H_2O$ [3.00 wt %] | $Fe(NO_3)_3 \cdot 9H_2O$ [0.172 wt %] | — | EG [96.828 wt %] | <1 | — |
| Example 1-9 | Oxide raw material liquid | $Zn(NO_3)_2 \cdot 6H_2O$ [3.00 wt %] | $Fe(NO_3)_3 \cdot 9H_2O$ [0.143 wt %] | $Mn(NO_3)_2 \cdot 6H_2O$ [0.044 wt %] | EG [96.813 wt %] | 2.78 | 31.1 |
| Example 1-10 | Oxide raw material liquid | $Zn(NO_3)_2 \cdot 6H_2O$ [1.840 wt %] | $Co(NO_3)_2 \cdot 6H_2O$ [0.289 wt %] | $Al(NO_3)_3 \cdot 9H_2O$ [1.948 wt %] | EG [95.923 wt %] | 0.54 | 16.3 |
| Comparative Example 1 | Oxide precipitation solvent | MeOH [100 wt %] | — | — | — | 6.25 | 20.4 |

| | | Formulation of the 2nd fluid (liquid B) | | | | |
|---|---|---|---|---|---|---|
| | | Formulation | | | pH | |
| | | Raw material [wt %] | Raw material [wt %] | Raw material [wt %] | pH | [° C.] |
| Example 1-1 | Oxide raw material liquid | ZnO [3.00 wt %] | KOH [46.56 wt %] | Pure water [50.44 wt %] | >14 | — |
| Example 1-2 | Oxide raw material liquid | ZnO [3.00 wt %] | KOH [46.56 wt %] | Pure water [50.44 wt %] | >14 | — |
| Example 1-3 | Oxide raw material liquid | ZnO [3.00 wt %] | KOH [46.56 wt %] | Pure water [50.44 wt %] | >14 | — |
| Example 1-4 | Oxide raw material liquid | ZnO [3.00 wt %] | KOH [46.56 wt %] | Pure water [50.44 wt %] | >14 | — |
| Example 1-5 | Oxide precipitation solvent | NaOH [9.00 wt %] | — | Pure water [91.00 wt %] | >14 | — |
| Example 1-6 | Oxide precipitation solvent | NaOH [9.00 wt %] | — | Pure water [91.00 wt %] | >14 | — |
| Example 1-7 | Oxide precipitation solvent | NaOH [13.50 wt %] | — | Pure water [86.50 wt %] | >14 | — |
| Example 1-8 | Oxide precipitation solvent | NaOH [13.50 wt %] | — | Pure water [86.50 wt %] | >14 | — |

TABLE 1-continued

|  |  |  |  |  |  |  |
|---|---|---|---|---|---|---|
| Example 1-9 | Oxide precipitation solvent | NaOH [13.50 wt %] | — | Pure water [86.50 wt %] | >14 | — |
| Example 1-10 | Oxide precipitation solvent | NaOH [13.50 wt %] | — | Pure water [86.50 wt %] | >14 | — |
| Comparative Example 1 | Oxide raw material liquid | ZnO [3.00 wt %] | KOH [46.56 wt %] | Pure water [50.44 wt %] | >14 | — |

Formulation of the 3rd fluid (liquid C:

| | Formulation | | | pH | |
|---|---|---|---|---|---|
| | Raw material [wt %] | Raw material [wt %] | Raw material [wt %] | pH | [° C.] |
| Example 1-1 | MeOH [99.0435 wt %] | fluorinating agent 1 [0.4726 wt %] | TEOS [0.4839 wt %] | 5.93 | 21.2 |
| Example 1-2 | MeOH [99.0435 wt %] | fluorinating agent 1 [0.4726 wt %] | TEOS [0.4839 wt %] | 5.93 | 21.2 |
| Example 1-3 | MeOH [99.0435 wt %] | fluorinating agent 1 [0.4726 wt %] | TEOS [0.4839 wt %] | 5.93 | 21.2 |
| Example 1-4 | MeOH [99.5045 wt %] | fluorinating agent 2 [0.2535 wt %] | TEOS [0.242 wt %] | 6.93 | 20.0 |
| Example 1-5 | NMP [99.1905 wt %] | fluorinating agent 3 [0.1055 wt %] | TEOS [0.704 wt %] | — | — |
| Example 1-6 | NMP [99.1543 wt %] | fluorinating agent 4 [0.1417 wt %] | TEOS [0.704 wt %] | — | — |
| Example 1-7 | MeOH [98.6168 wt %] | fluorinating agent 1 [0.5848 wt %] | TEOS [0.7984 wt %] | 5.97 | 16.3 |
| Example 1-8 | MeOH [98.6168 wt %] | fluorinating agent 1 [0.5848 wt %] | TEOS [0.7984 wt %] | 5.97 | 16.3 |
| Example 1-9 | MeOH [98.6168 wt %] | fluorinating agent 1 [0.5848 wt %] | TEOS [0.7984 wt %] | 5.97 | 16.3 |
| Example 1-10 | MeOH [98.6168 wt %] | fluorinating agent 1 [0.5848 wt %] | TEOS [0.7984 wt %] | 5.97 | 16.3 |
| Comparative Example 1 | MeOH [99.5161 wt %] | — | TEOS [0.4839 wt %] | 5.88 | 17.7 |

TABLE 2

| | Introduction flow rate (liquid sending flow rate) [ml/min] | | | Introduction temperature (liquid sending temperature) [° C.] | | | Introduction pressure (liquid sending pressure) [MPaG] | | | Discharged liquid | |
|---|---|---|---|---|---|---|---|---|---|---|---|
| | Liquid A | Liquid B | Liquid C | Liquid A | Liquid B | Liquid C | Liquid A | Liquid B | Liquid C | pH | Temperature [° C.] |
| Example 1-1 | 600 | 50 | 100 | 21 | 21 | 21 | 0.064 | 0.10 | 0.10 | >14 | — |
| Example 1-2 | 600 | 50 | 100 | 40 | 40 | 41 | 0.079 | 0.10 | 0.10 | >14 | — |
| Example 1-3 | 600 | 50 | 100 | 60 | 62 | 61 | 0.087 | 0.10 | 0.10 | >14 | — |
| Example 1-4 | 600 | 50 | 100 | 21 | 21 | 21 | 0.037 | 0.10 | 0.10 | >14 | — |
| Example 1-5 | 400 | 50 | 100 | 20 | 21 | 21 | 0.056 | 0.10 | 0.10 | — | — |
| Example 1-6 | 400 | 50 | 100 | 21 | 20 | 20 | 0.055 | 0.10 | 0.10 | — | — |
| Example 1-7 | 600 | 50 | 100 | 161 | 87 | 56 | 0.101 | 0.10 | 0.10 | 11.75 | 32.5 |
| Example 1-8 | 600 | 50 | 100 | 162 | 89 | 55 | 0.092 | 0.10 | 0.10 | 11.48 | 28.6 |
| Example 1-9 | 600 | 50 | 100 | 161 | 89 | 56 | 0.089 | 0.10 | 0.10 | 11.65 | 29.0 |
| Example 1-10 | 600 | 50 | 100 | 161 | 89 | 55 | 0.099 | 0.10 | 0.10 | 7.16 | 26.9 |
| Comparative Example 1 | 600 | 50 | 100 | 19 | 20 | 19 | 0.058 | 0.10 | 0.10 | >14 | — |

| | F/Si/Zn (Zn + M2, M3) [molar ratio] | | | | | | Average |
|---|---|---|---|---|---|---|---|
| | [Calculated value] | | | [EDS] | | | primary particle |
| | F | Si | Zn (Zn + M2, M3) | F | Si | Zn (Zn + M2, M3) | diameter [nm] |
| Example 1-1 | 25.7 | 6.0 | 68.3 | 25.4 | 5.9 | 68.7 | 7.7 |
| Example 1-2 | 25.7 | 6.0 | 68.3 | 26.2 | 6.1 | 67.7 | 8.2 |
| Example 1-3 | 25.7 | 6.0 | 68.3 | 25.8 | 6.0 | 68.2 | 8.6 |
| Example 1-4 | 8.5 | 5.7 | 85.8 | 8.3 | 5.9 | 85.8 | 7.9 |
| Example 1-5 | 6.5 | 7.2 | 86.3 | 6.1 | 7.1 | 86.8 | 8.4 |
| Example 1-6 | 6.5 | 7.2 | 86.3 | 6.9 | 6.5 | 86.6 | 8.3 |

TABLE 2-continued

| | | | | | | | |
|---|---|---|---|---|---|---|---|
| Example 1-7 | 20.8 | 6.1 | 73.1 | 20.4 | 5.9 | 73.7 | 7.9 |
| Example 1-8 | 20.8 | 6.1 | 73.1 | 21.2 | 6.2 | 72.6 | 8.9 |
| Example 1-9 | 20.8 | 6.1 | 73.1 | 20.6 | 6.6 | 72.8 | 7.9 |
| Example 1-10 | 20.8 | 6.1 | 73.1 | 19.9 | 6.5 | 73.6 | 7.1 |
| Comparative Example 1 | 0.0 | 6.2 | 93.8 | 0.0 | 6.0 | 94.0 | 8.9 |

In Examples 1-1 to 1-3, a temperature at which metal oxide particles were precipitated, and a fluid containing a silicon compound and a substance containing CF bonds (fluorinating agent) was allowed to act on the metal oxide particles, was changed for the purpose of changing a ratio of Si—OH bonds or a ratio of CF bonds/Si—OH bonds which is a ratio of Si—OH bonds relative to CF bonds. In Examples 1-4 to 1-6, type of a fluorinating agent in Example 1-1 was changed. In Examples 1-7 to 1-10, the metal oxide to be coated is not only zinc (Zn), but also cobalt (Co), iron (Fe), manganese (Mn) or aluminum (Al) for the purpose of coloring the silicon compound coated zinc oxide particles.

In Examples 1-1 to 1-10, a ratio of Si—OH bonds and CF bonds contained in the silicon compound coated zinc oxide particles was controlled between two processing surfaces being capable of approaching to and separating from each other and rotating relative to each other. As a further example of modification treatment of a functional group contained in the silicon compound coated zinc oxide particles (Example 1-11), the silicon compound coated zinc oxide particles were fluorinated by reacting the silicon compound coated zinc oxide particles obtained in Comparative Example 1 with trifluoroacetic anhydride. Specifically, the silicon compound coated zinc oxide particles obtained in Comparative Example 1 were added to methyl ethyl ketone in an amount of 0.1% by mass as silicon compound coated zinc oxide particles, and were mixed and dispersed homogeneously by stirring using the high-speed rotary dispersion emulsification apparatus CLEAMIX (product name: CLM-2.2 S, M. Technique Co., Ltd.) at preparation temperature of 30° C. and at the rotor rotational speed of 20,000 rpm for 30 min to prepare the silicon compound coated zinc oxide particle dispersion. While stirring the dispersion at 20,000 rpm using CLEAMIX, triethylamine (Wako Pure Chemical Industry Ltd.) was added in an amount of 2 mol times relative to zinc oxide contained in the silicon compound coated zinc oxide particles, and trifluoroacetic anhydride was added to the silicon compound coated zinc oxide particles in an amount of 1 mol time relative to zinc oxide contained in the silicon compound coated zinc oxide particles (process temperature: 30° C. to 35° C.). After addition of trifluoroacetic anhydride, the process was continued for 30 minutes while keeping the rotation number of CLEAMIX at 20,000 rpm and the process temperature at 30° C. to 35° C. After completion of the treatment, dry powders and wet cake sample were prepared from the fluorinated silicon compound coated zinc oxide particle dispersion. The preparation method was conducted according to a conventional method of this type of processing. In the fluorinated silicon compound coated zinc oxide particle dispersion, the fluorinated silicon compound coated zinc oxide particles were settled, and the supernatant was removed. Thereafter, the fluorinated silicon compound coated zinc oxide particles were washed and settled three times repetitively with 100 parts by weight of methyl ethyl ketone, and then, were washed and settled three times repetitively with methanol. A part of the finally obtained wet cake of the fluorinated silicon compound coated zinc oxide particles was dried at 25° C. at −0.10 MPaG for 20 hours to obtain the dry powders. The rest was the wet cake sample. (Example 1-11)

The silicon compound coated zinc oxide particles obtained in Example 1-1 were subjected with a heat treatment using an electric furnace as a modification treatment of a functional group contained in the silicon compound of the silicon compound coated zinc oxide particles. The heat treatment conditions were, Example 1-1: untreated, Example 1-12: 100° C. for 30 minutes, Example 1-13: 200° C. for 30 minutes, Example 1-14: 200° C. for 60 minutes, Example 1-15: 200° C. for 90 minutes.

The silicon compound coated zinc oxide particles of Example 1-1 were subjected to a heat treatment using an electric furnace while flowing methane trifluoride gas, as a modification treatment of a functional group contained in the silicon compound of the silicon compound coated zinc oxide particles. The heat treatment conditions were, Example 1-16: 100° C. for 60 minutes (gas flow: 2 L/min), Example 1-17: 200° C. for 60 minutes (gas flow: 2 L/min), Example 1-18: 200° C. for 60 minutes (gas flow: 5 L/min).

The silicon compound coated zinc oxide particles obtained in Comparative Example 1 were subjected to a heat treatment using an electric furnace as a modification treatment of a functional group contained in the silicon compound of the silicon compound coated zinc oxide particles. The heat treatment conditions were, Comparative Example 1: untreated, Example 1-19: 100° C. for 30 minutes, Example 1-20: 200° C. for 30 minutes, Example 1-21: 200° C. for 60 minutes, Example 1-22: 200° C. for 90 minutes.

Figure 2:
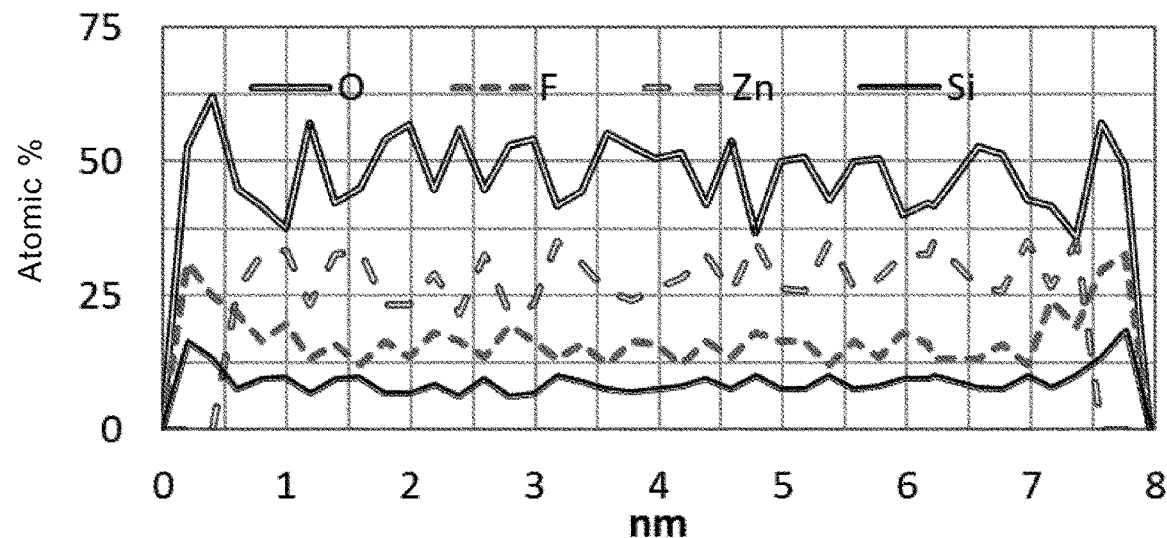
FIG. 2 shows a linear analysis result of the silicon compound coated zinc oxide particles obtained in Example 1-2.

FIG. 1 shows an STEM mapping result of the silicon compound coated zinc oxide particles obtained in Example 1-2. FIG. 2 shows the result of a linear analysis at the position indicated by the broken line in the BF image of FIG. 1. In FIG. 1, (a) shows a mapping result of a bright field (BF image), (b) shows a mapping result of silicon (Si), (c) shows a mapping result of zinc (Zn), (d) shows a mapping result of oxygen (O), and (e) shows a mapping result of fluorine (F). FIG. 2 shows the result of a linear analysis at the position indicated by the broken line in the BF image of FIG. 1, which shows the atomic % (mol %) of the elements detected in the line part from the edge to the other edge of the particle. As seen in FIG. 2, oxygen, silicon and fluorine were detected from end to end in the analysis range in the linear analysis, but zinc was detected only up to about several nm inside from the edge of the particle. It is understood that the surface of zinc oxide particle was coated with a silicon compound containing a silicon oxide and a compound containing a fluorine. As seen from FIGS. 1 and 2, the silicon compound coated zinc oxide particles obtained in Example 1-2 were observed as a zinc oxide particle in which whole the particle was coated with a silicon compound and a compound containing a fluorine. In the silicon compound coated zinc oxide particles obtained in Example 1-1 and Examples 1-3 to 1-22, STEM mapping and linear analysis results similar to those of Example 1-2 were obtained. However, in Examples 1-7 and 1-9, the silicon compound coated zinc oxide particles in which whole the zinc oxide particle was not coated with a silicon oxide, but a part of the surface of the zinc oxide particle was coated with a silicon compound containing a silicon oxide, were also observed. The present invention can be performed as silicon compound coated oxide particles in which at least a part of a surface of a metal oxide particle is coated with a silicon compound.

Figure 3:
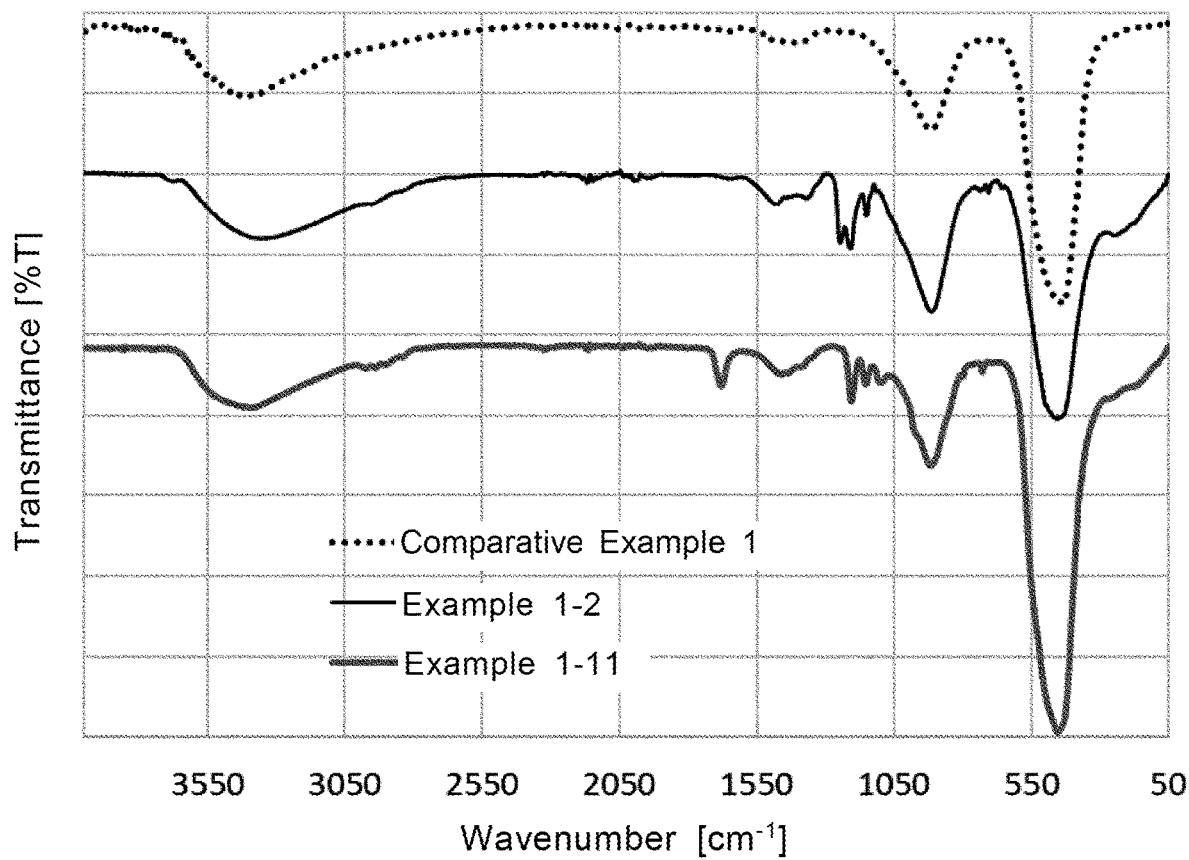
FIG. 3 shows IR measurement results of the silicon compound coated zinc oxide particles obtained in Example 1-2, Example 1-11 and Comparative Example 1.

FIG. 3 shows IR measurement results measured by the ATR method of the silicon compound coated zinc oxide particles obtained in Example 1-2, Example 1-11 and Comparative Example 1. A new peak was observed in the area of around 1,000 cm$^{-1}$ cm to around 1,300 cm$^{-1}$ in the IR measurement results of the silicon compound coated oxide particles obtained in Example 1-2 and Example 1-11, in comparison with the IR measurement result of the silicon compound coated zinc oxide obtained in Comparative Example 1. In addition, a peak around 1,673 cm$^{-1}$, derived from a carbonyl group was observed in the silicon compound coated zinc oxide particles obtained in Example 1-11. Thus, it has been found that ester bonds were generated by reacting trifluoroacetic anhydride with the silicon compound coated zinc oxide particles obtained in Comparative Example 1.

Figure 6:
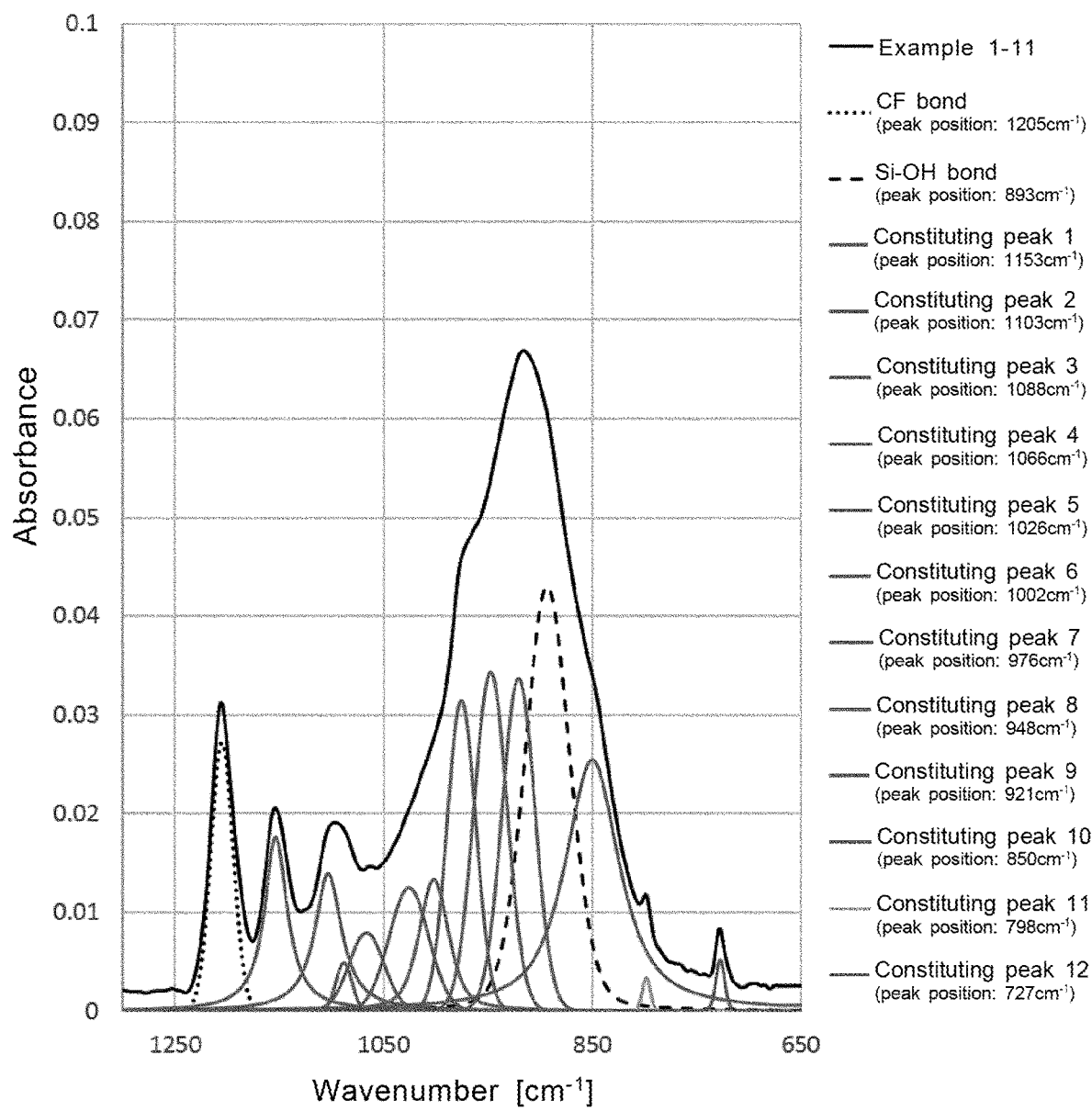
FIG. 6 shows a result of waveform separation of the IR measurement result of the silicon compound coated zinc oxide particles obtained in Example 1-11 between wavenumbers 650 $cm^{-1}$ and 1,300 $cm^{-1}$.

FIGS. 4, 5 and 6 show the results of waveform separation of the IR measurement results between wavenumbers 650 cm$^{-1}$ and 1,300 cm$^{-1}$, respectively of the silicon compound coated zinc oxide particles obtained in Comparative Example 1, of the silicon compound coated zinc oxide particles obtained in Example 1-2, and of the silicon compound coated zinc oxide particles obtained in Example 1-11.

In the waveform separation result of the silicon compound coated zinc oxide particles obtained in Comparative Example 1 as seen in FIG. 4, only a peak around 913 cm$^{-1}$ derived from Si—OH bonds and "constituting peak 1" around 1,033 cm$^{-1}$ constituting a peak of Comparative Example 1 different from a peak of Si—OH bonds. As seen in FIGS. 5 and 6, in those of the silicon compound coated zinc oxide particles obtained in Example 1-2 and Example 1-11, new peaks were observed in addition to the above peaks. The peaks observed around 1,219 cm$^{-1}$ and 1,205 cm$^{-1}$ among the separated waveform peaks shown in FIG. 5, and the peak around 1,205 cm$^{-1}$ among the separated waveform peaks shown in FIG. 6, can be assigned to CF bonds, so that it has been confirmed that the silicon compound coated zinc oxide particles obtained in Example 1-2 and Example 1-11 were silicon compound coated zinc oxide particles containing CF bonds. In addition, it has been found that a ratio of the area of Si—OH bonds relative to the total area of the separated waveform peaks was lowered in the fluorinated silicon compound coated zinc oxide particles obtained in Example 1-2 and Example 1-11, as compared with one in the silicon compound coated zinc oxide particles obtained in Comparative Example 1. Namely, it has been found that a ratio of Si—OH bonds contained in the particles was low and a ratio of CF bonds was high in the fluorinated silicon compound coated zinc oxide particles obtained in Example 1-2 and Example 1-11, as compared with the silicon compound coated zinc oxide particles obtained in Comparative Example 1. In the present invention, wettability such as water repellency, oil repellency or hydrophilicity and color characteristics of the silicon compound coated zinc oxide particles can be controlled, by controlling an area ratio of the area of Si—OH bonds (Si—OH ratio [%]) relative to the total area of the separated waveform peaks in the wavenumber of 650 cm$^{-1}$ to 1,300 cm$^{-1}$ in the IR spectrum, or an area ratio of CF bonds/Si—OH bonds which is an area ratio of the area ratio of Si—OH bonds (Si—OH ratio [%]) relative to the area ratio of CF bonds (CF ratio [%]).

Figure 7:
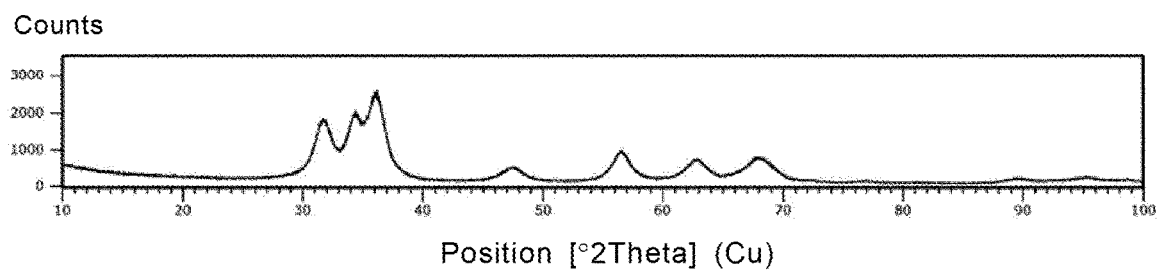
FIG. 7 shows an XRD measurement result of the silicon compound coated zinc oxide particles obtained in Example 1-2.

FIG. 7 shows an XRD measurement result of the silicon compound coated zinc oxide particles obtained in Example 1-2. As seen from FIG. 7, in the XRD measurement, only a peak derived from ZnO was detected. Namely, it has been confirmed that the silicon compound containing a silicon oxide observed in the STEM and IR measurements was an amorphous silicon compound. Furthermore, in Example 1-1 and Examples 1-3 to 1-22, similar XRD measurement results were obtained.

Figure 8:
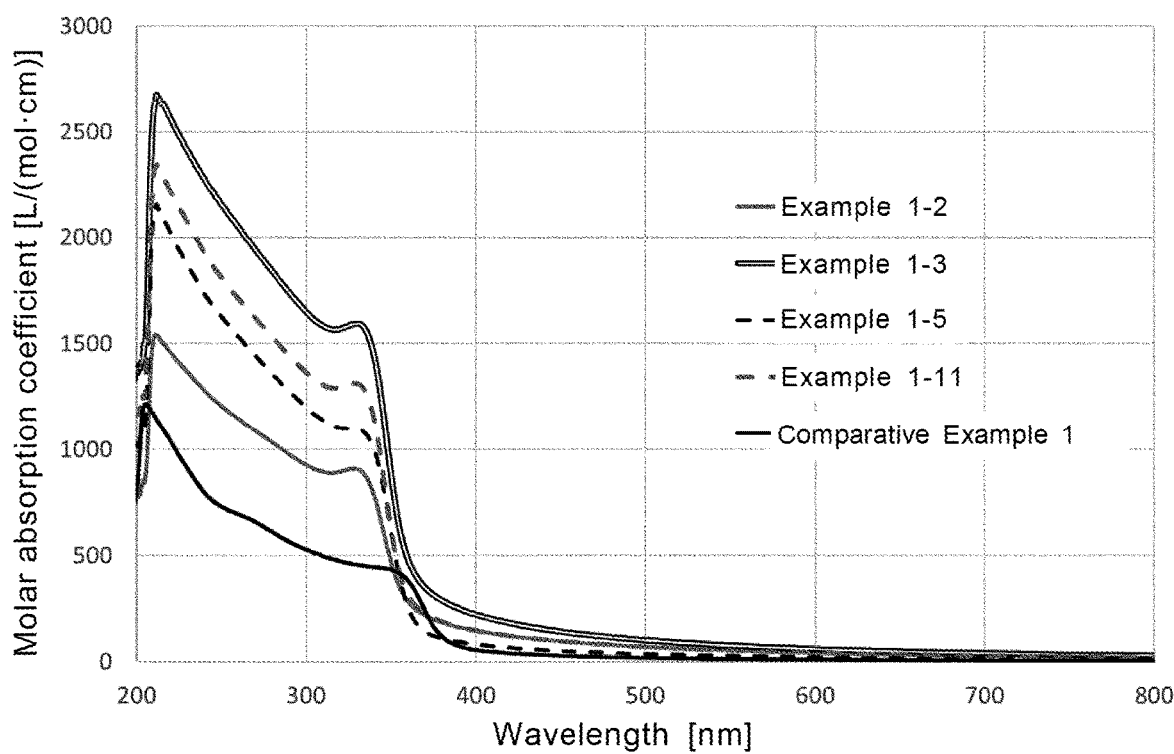
FIG. 8 shows a graph of molar absorption coefficients of the dispersions obtained by dispersing in propylene glycol monomethyl ether the silicon compound coated zinc oxide particles obtained in Example 1-2, Example 1-3, Example 1-5 and Example 1-11, and molar absorption coefficients of the dispersion obtained by dispersing in propylene glycol the silicon compound coated zinc oxide particles obtained in Comparative Example 1.

FIG. 8 shows a graph of the molar absorption coefficient results of the dispersions obtained by dispersing in propylene glycol monomethyl ether (PGME) the fluorinated silicon compound coated zinc oxide particles obtained in Example 1-2, Example 1-3, Example 1-5 and Example 1-11, and the molar absorption coefficient result of the dispersion obtained by dispersing in propylene glycol (PG) the silicon compound coated zinc oxide particles obtained in Comparative Example 1. A dispersion medium for Comparative Example 1 was propylene glycol, because the particles of Comparative Example 1 were not fluorinated silicon compound coated zinc oxide particles, and hydrophilicity of the particles was high due to the ratio of Si—OH bonds exceeding 70%. A dispersion medium for Example 1-2, Example 1-3, Example 1-5 and Example 1-11, was changed to propylene glycol monomethyl ether, because water repellency was increased by fluorination. Thereby, molar absorption coefficients were measured in a condition that primary particle diameters and dispersed particle diameters were similar. In the case that the silicon compound coated zinc oxide particles obtained in Comparative Example 1 were dispersed in propylene glycol monomethyl ether, dispersion stability was very low, and the particles were precipitated immediately after completion of dispersing treatment. In the case that the silicon compound coated zinc oxide particles obtained in Example 1-2, Example 1-3, Example 1-5, and Example 1-11 were dispersed in propylene glycol, similarly the particles were precipitated immediately after completion of dispersing treatment. Accordingly, in the present invention, in all Examples described below, propylene glycol monomethyl ether was used as a dispersion medium of a dispersion for measuring a molar absorption coefficient and transmittance, and in all Comparative Examples described below, propylene glycol was used as a dispersion medium.

As seen from FIG. 8, it has been found that molar extinction coefficients in the wavelength range of 200 nm to 380 nm of the silicon compound coated zinc oxide particles obtained in Example 1-2, Example 1-3, Example 1-5 and Example 1-11 were increased more than one of Comparative Example 1. Namely, it has been found that by changing a ratio of Si—OH bonds contained in the particles, an average molar absorption coefficient in the wavelength range of 200 nm to 380 nm changes. In Examples 1-1 to 1-22 above, the average molar absorption coefficients in the wavelength range of 200 nm to 380 nm are 650 L/(mol·cm) or more, and the particles have an ability to effectively absorb lights in the ultraviolet wavelength range of 200 nm to 380 nm.

Figure 9:
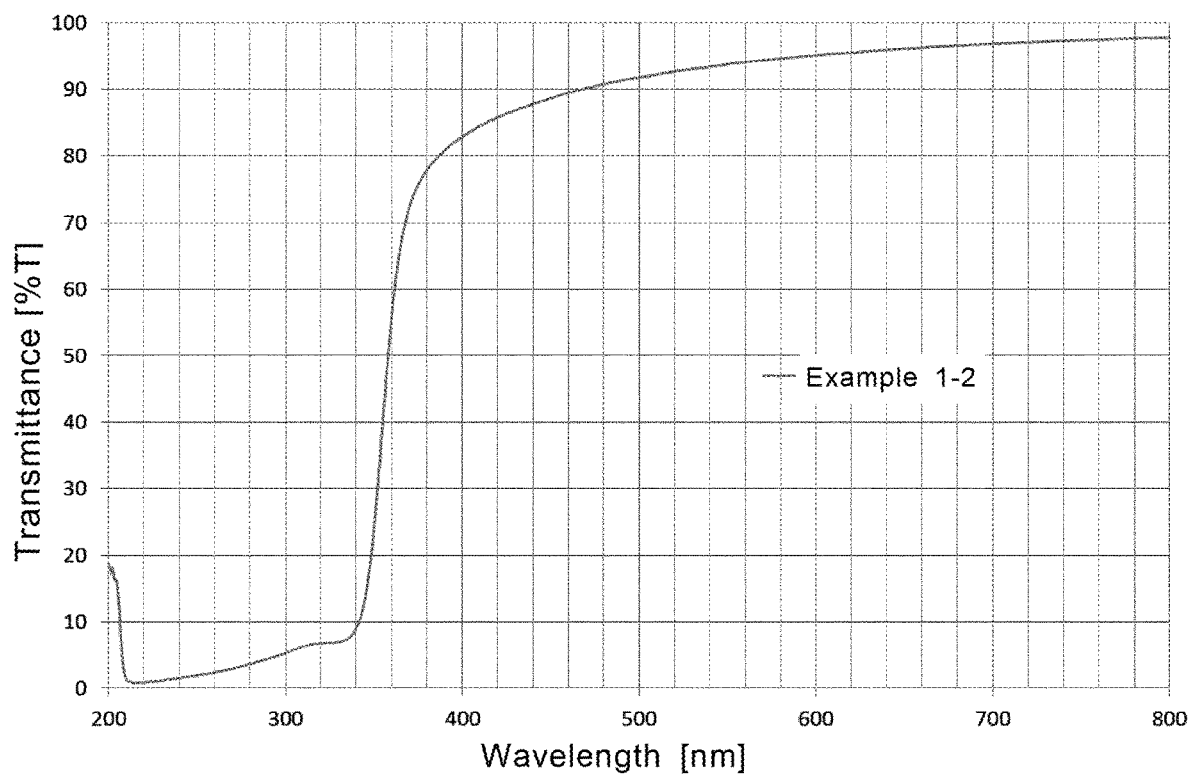
FIG. 9 shows a graph of transmittance of the dispersion obtained by dispersing in propylene glycol monomethyl ether the silicon compound coated zinc oxide particles obtained in Example 1-2.

FIG. 9 shows a transmission spectrum of the dispersion obtained by dispersing in propylene glycol monomethyl ether the silicon compound coated zinc oxide particles obtained in Example 1-2. As seen from FIG. 9, an average transmittance in the wavelength range of 200 nm to 380 nm was 15% or less, and one in the wavelength range of 380 nm to 780 nm was 80% or more, so that the dispersion has very high transmission property for lights in the visible region, and can be suitably used for various compositions.

Figure 10:
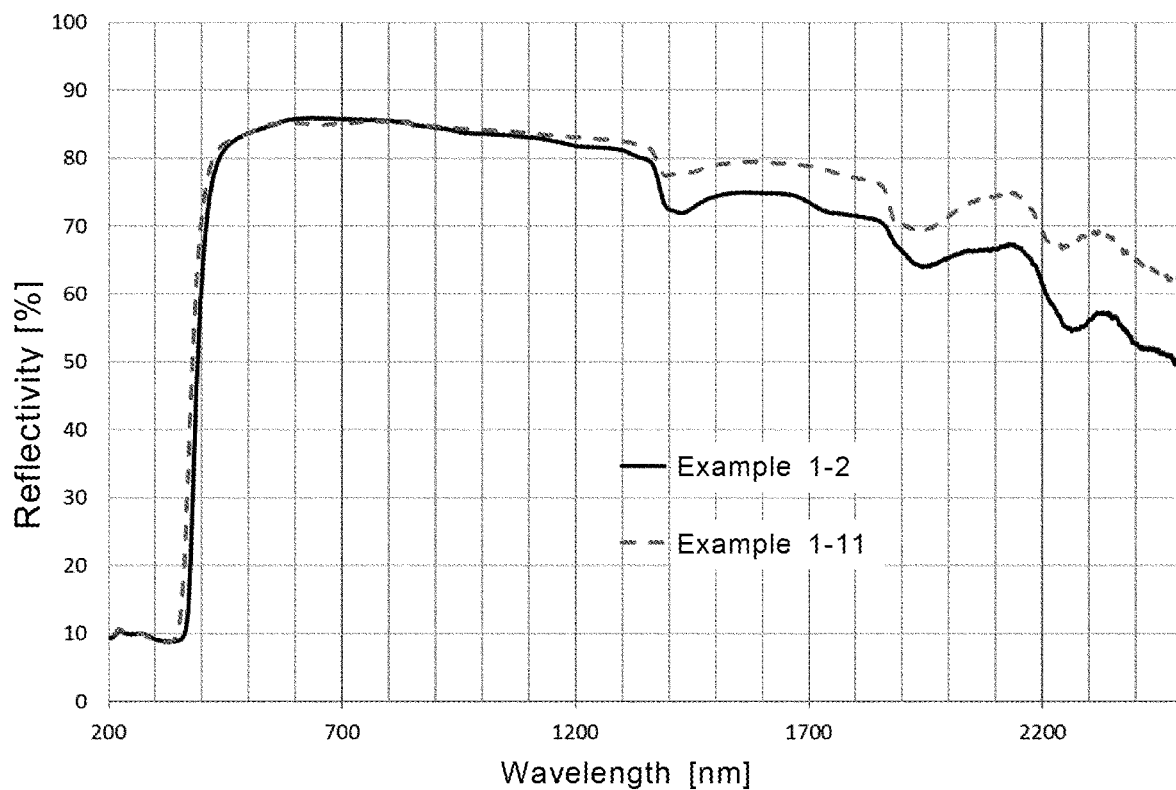
FIG. 10 shows a graph of reflectivity of the silicon compound coated zinc oxide particles obtained in Example 1-2 and Example 1-11.

FIG. 10 shows reflectivity measurement results of the silicon compound coated zinc oxide particles obtained in Example 1-2 and Example 1-11. As seen from FIG. 10, an average reflectivity in the wavelength range of 780 nm to 2,500 nm was 50% or more, so that it has been found that the particles have high reflection property for lights in the near infrared region.

A dispersion obtained by dispersing the silicon compound coated zinc oxide particles obtained in Example 1-13 in propylene glycol monomethyl ether was coated on a glass substrate using the spin coater (MS-A100, MIKAS Co., Ltd.), and dried in vacuum (−0.1 MPaG) at 200° C. for 2 hours to obtain a silicon compound coated zinc oxide particle coating film. Further, a dispersion obtained by dispersing the silicon compound coated zinc oxide particles obtained in Comparative Example 1 in propylene glycol was coated on a glass substrate using the spin coater (MS-A100, MIKASA Co., Ltd.), and dried in vacuum (−0.1 MPaG) at 20° C. for 20 hours to obtain a silicon compound coated zinc oxide particle coating film.

Figure 11:
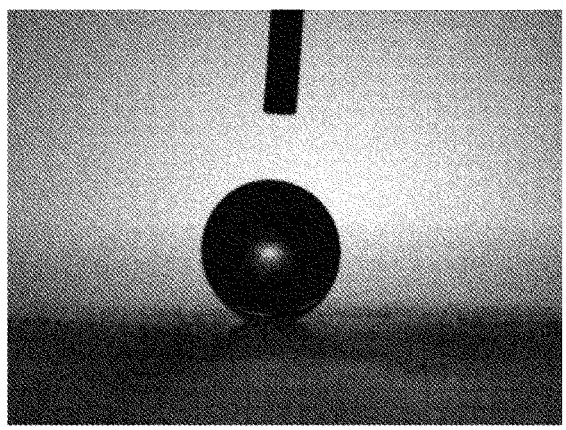
FIG. 11 shows the state of adhesion of a water drop to the coating films obtained by applying on a glass substrate the silicon compound coated zinc oxide particles obtained in Example 1-13 and the silicon compound coated zinc oxide particles obtained in Comparative Example 1, and the contact angle measurement results of pure water.
Figure 11:
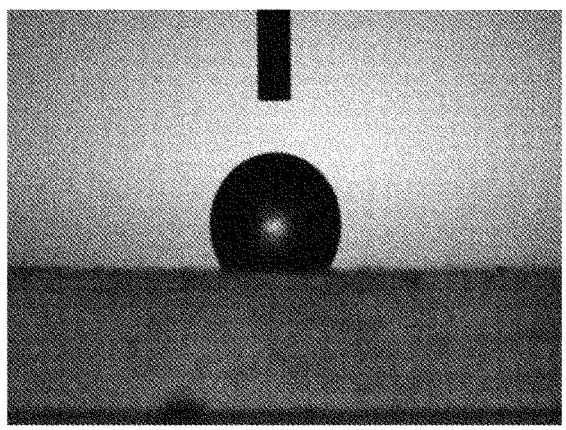

A contact angle of the obtained coating film against pure water or castor oil was measured using the contact angle meter (LSE-B 100; ASUMI GIKEN, Limited). The contact angle was calculated using the θ/2 calculation method. A photograph of the measurement using pure water is shown in FIG. 11. The contact angle of Example 1-13 was 159.7°, and the contact angle of Comparative Example 1 was 95.1°. From this result, it has been found that the silicon compound coated zinc oxide particles obtained in Example 1-13 have improved water repellency.

Table 3 shows a ratio of Si—OH bonds, ratio of CF bonds, ratio of CF bonds/Si—OH bonds, average reflectivity, average molar absorption coefficient, average transmittance, L* value, a* value, b* value, hue, chroma, and contact angle of the silicon compound coated zinc oxide particles obtained in Examples 1-1 to 1-22 and Comparative Example 1.

TABLE 3

|  |  | Example 1-1 | Example 1-2 | Example 1-3 | Example 1-4 | Example 1-5 | Example 1-6 |
|---|---|---|---|---|---|---|---|
| Ratio of Si—OH [%] |  | 58.6 | 31.2 | 10.4 | 21.2 | 29.1 | 28.4 |
| Ratio of CF [%] |  | 2.8 | 7.8 | 17.5 | 14.1 | 8.6 | 9.0 |
| Ratio of CF bonds/Si—OH bonds |  | 0.05 | 0.25 | 1.68 | 0.67 | 0.30 | 0.32 |
| Average reflectivity [%] | 780-2,500 nm | 53.8 | 71.9 | 77.8 | 73.2 | 72.2 | 72.3 |
| Average molar absorption coefficient [L/I(mol · cm)] | 200-380 nm (dispersion medium: PGME) | 723 | 933 | 1564 | 1222 | 1186 | 1201 |
| Average tranmittance [%] | 200-380 nm (dispersion medium: PGME) | 13.2 | 14.3 | 13.7 | 17.5 | 11.6 | 12.7 |
|  | 380-780 nm (dispersion medium: PGME) | 92.1 | 93.0 | 89.6 | 89.6 | 92.6 | 87.2 |
| Color calculation | L* | 92.84 | 93.80 | 94.30 | 94.20 | 93.39 | 94.36 |
|  | a* | −0.27 | −0.6 | −0.32 | −0.37 | −0.56 | −1.18 |
|  | b* | 2.19 | 2.07 | 1.32 | −0.24 | 2.36 | 2.99 |
|  | Hue H | −8.11 | −3.45 | −4.19 | 0.65 | −4.21 | −2.53 |
|  | Chroma C | 2.21 | 2.16 | 1.36 | 0.44 | 2.43 | 3.21 |
| Contact angle [°] | Pure water | 125.3 | 153.6 | 160.8 | 157.1 | 154.4 | 155.1 |
| Contact angle [°] | Castor oil | 70.1 | 90.0 | 95.4 | 92.1 | 90.1 | 90.2 |

|  |  | Example 1-7 | Example 1-8 | Example 1-9 | Example 1-10 | Example 1-11 | Example 1-12 |
|---|---|---|---|---|---|---|---|
| Ratio of Si—OH [%] |  | 27.2 | 30.2 | 25.1 | 23.8 | 25.3 | 23.3 |
| Ratio of CF [%] |  | 9.5 | 8.3 | 12.8 | 13.2 | 11.1 | 13.6 |
| Ratio of CF bonds/Si—OH bonds |  | 0.35 | 0.27 | 0.51 | 0.56 | 0.44 | 0.59 |
| Average reflectivity [%] | 780-2,500 nm | 72.5 | 72.0 | 73.0 | 73.1 | 73.2 | 73.1 |
| Average molar absorption coefficient [L/I(mol · cm)] | 200-380 nm (dispersion medium: PGME) | 1209 | 1132 | 1211 | 1214 | 1224 | 1216 |
| Average tranmittance [%] | 200-380 nm (dispersion medium: PGME) | 12.3 | 17.5 | 13.7 | 13.7 | 12.3 | 17.5 |
|  | 380-780 nm (dispersion medium: PGME) | 89.6 | 83.8 | 89.6 | 87.2 | 89.6 | 89.6 |
| Color calculation | L* | 64.68 | 78.22 | 71.01 | 68.90 | 93.78 | 93.15 |
|  | a* | −25.4 | 8.92 | 26.71 | 21.23 | −0.25 | −0.19 |
|  | b* | −16.42 | 25.34 | 10.34 | −19.79 | 0.88 | 1.46 |
|  | Hue H | 0.65 | 2.84 | 0.39 | −0.93 | −3.52 | −7.68 |
|  | Chroma C | 30.25 | 26.86 | 28.64 | 29.02 | 0.91 | 1.47 |
| Contact angle [°] | Pure water | 155.6 | 153.8 | 156.0 | 156.1 | 155.8 | 156.3 |
| Contact angle [°] | Castor oil | 90.2 | 90.1 | 90.8 | 91.4 | 90.4 | 91.4 |

|  |  | Example 1-13 | Example 1-14 | Example 1-15 | Example 1-16 | Example 1-17 | Example 1-18 |
|---|---|---|---|---|---|---|---|
| Ratio of Si—OH [%] |  | 15.0 | 8.8 | 5.1 | 56.3 | 48.3 | 39.0 |
| Ratio of CF [%] |  | 15.3 | 18.2 | 20.9 | 4.3 | 5.4 | 6.2 |
| Ratio of CF bonds/Si—OH bonds |  | 1.02 | 2.06 | 4.10 | 0.08 | 0.11 | 0.16 |

TABLE 3-continued

|  |  |  |  |  |  |  |  |
|---|---|---|---|---|---|---|---|
| Average reflectivity [%] | 780-2,500 nm | 77.3 | 78.3 | 79.1 | 55.4 | 56.9 | 61.3 |
| Average molar absorption coefficient [L/I(mol · cm)] | 200-380 nm (dispersion medium: PGME) | 1456 | 1639 | 1788 | 731 | 821 | 902 |
| Average tranmittance [%] | 200-380 nm (dispersion medium: PGME) | 13.7 | 13.7 | 12.7 | 11.2 | 13.7 | 11.3 |
|  | 380-780 nm (dispersion medium: PGME) | 89.6 | 88.3 | 87.2 | 90.1 | 89.8 | 89.6 |
| Color calculation | L* | 94.20 | 90.36 | 91.30 | 91.99 | 92.36 | 93.94 |
|  | a* | −0.36 | −0.46 | 1.26 | 0.26 | −0.16 | −0.11 |
|  | b* | 1.19 | 1.56 | 1.36 | 1.89 | 1.18 | 0.49 |
|  | Hue H | −3.31 | −3.39 | 1.08 | 7.27 | −7.38 | −4.45 |
|  | Chroma C | 1.24 | 1.63 | 1.85 | 1.91 | 1.19 | 0.50 |
| Contact angle [°] | Pure water | 159.7 | 161.8 | 165.2 | 128.6 | 140.3 | 150.6 |
| Contact angle [°] | Castor oil | 92.6 | 96.1 | 97.7 | 71.2 | 78.9 | 84.3 |

|  |  | Example 1-19 | Example 1-20 | Example 1-21 | Example 1-22 | Comparative Example 1 |
|---|---|---|---|---|---|---|
| Ratio of Si—OH [%] |  | 66.6 | 43.6 | 22.3 | 5.4 | 73.2 |
| Ratio of CF [%] |  | 0.0 | 0.0 | 0.0 | 0.0 | 0.0 |
| Ratio of CF bonds/Si—OH bonds |  | 0.00 | 0.00 | 0.00 | 0.00 | 0.00 |
| Average reflectivity [%] | 780-2,500 nm | 53.4 | 59.4 | 73.1 | 78.7 | 47.9 |
| Average molar absorption coefficient [L/I(mol · cm)] | 200-380 nm (dispersion medium: PGME) | 689 | 843 | 1218 | 1756 | 623*) |
| Average tranmittance [%] | 200-380 nm (dispersion medium: PGME) | 10.9 | 13.7 | 17.5 | 17.5 | 11.3*) |
|  | 380-780 nm (dispersion medium: PGME) | 89.6 | 89.6 | 88.3 | 87.2 | 94.1*) |
| Color calculation | L* | 92.64 | 90.36 | 94.36 | 94.16 | 95.93 |
|  | a* | 0.36 | 0.41 | 0.32 | −1.27 | −0.41 |
|  | b* | 2.13 | 1.13 | 0.86 | −0.69 | 1.56 |
|  | Hue H | 5.92 | 2.76 | 2.69 | 0.54 | −3.80 |
|  | Chroma C | 2.16 | 1.20 | 0.92 | 1.45 | 1.61 |
| Contact angle [°] | Pure water | 113.3 | 146.6 | 156.6 | 164.0 | 95.1 |
| Contact angle [°] | Castor oil | 56.9 | 82.3 | 91.9 | 97.3 | 42.1 |

*)PG was used as a dispersion medium in average molar absorption coefficient and average transmittance measurements.

As seen from Table 3, it has been observed that when a ratio of Si—OH bonds decreases, or a ratio of CF bonds or a ratio of CF bonds/Si—OH bonds increases, an average reflectivity in the wavelength range of 780 nm to 2,500 nm, and an average molar absorption coefficient in the wavelength range of 200 nm to 380 nm, and a contact angle tend to increase. In the silicon compound coated zinc oxide particles of the present invention, preferably a ratio of CF bonds/Si—OH bonds is 0 or more and 4.5 or less, a ratio of Si—OH bonds is 5% or more and 70% or less, and an average molar absorption coefficient in the wavelength range of 200 nm to 380 nm in the state of a dispersion in which the silicon compound coated oxide particles are dispersed in a dispersion medium is 650 L/(mol·cm) or more. Further, as seen in Examples 1-7 to 1-10, it has been found that coloring was also possible by combining elements such as Fe, Co, Mn, and Al with zinc oxide particles.

From these results, it has been found that by controlling a ratio of Si—OH bonds or a ratio of CF bonds/Si—OH bonds contained in the silicon compound coated zinc oxide particles, an average molar absorption coefficient in the wavelength range of 200 nm to 380 nm, an average reflectivity in the wavelength range of 780 nm to 2,500 nm, and wettability such as water repellency, oil repellency or hydrophilicity can be controlled. More specifically, it has been found that by controlling a ratio of Si—OH bonds contained in the silicon compound coated zinc oxide particles to be low and by controlling a ratio of CF bonds/Si—OH bonds to be high, an average reflectivity in the wavelength range of 780 nm to 2,500 nm, and water repellency or oil repellency can be increased.

Example 2

Example 2 below describes silicon compound coated iron oxide particles in which at least a part of a surface of an iron oxide particle as an oxide particle is coated with a silicon compound. The particles were prepared in the same manner as in Examples 1-1 to 1-6 except that the preparation conditions were changed to those shown in Tables 4 and 5. Regarding the substances represented by the chemical formula and abbreviations set forth in Table 4, MeOH is methanol (Godo Co., Ltd.), TEOS is tetraethyl orthosilicate (Wako Pure Chemical Industry Ltd.), Fe(NO$_3$)$_3$·9H$_2$O is iron nitrate nonahydrate (Kanto Kagaku Co., Ltd.), NaOH is sodium hydroxide (Kanto Kagaku Co., Inc.), NMP is N-methyl-2-pyrrolidone (Kishida Chemical Co., Ltd.), fluorinating agent 1 is triethoxy-1H, 1H, 2H, 2H-heptadecafluorodecylsilane (Tokyo Chemical Industry Co., Ltd.), fluorinating agent 2 is trimethoxy-(3,3,3-trifluoropropyl)-silane (Tokyo Chemical Industry Co., Ltd.), fluorinating agent 3 is trifluoroacetic anhydride (Kanto Kagaku Co., Inc.), and fluorinating agent 4 is trifluoromethanesulfonic anhydride (Kanto Kagaku Co., Inc.).

As an STEM mapping result and linear analysis result and XRD measurement result, the same results as in Example 1 were obtained, and in the XRD measurement result, only a peak derived from a-$Fe_2O_3$ was detected.

Table 6 shows a ratio of Si—OH bonds, ratio of CF bonds, ratio of CF bonds/Si—OH bonds, average reflectivity, average molar absorption coefficient, average transmittance, and contact angle of the silicon compound coated iron oxide particles obtained in Examples 2-1 to 2-6 and Comparative Example 2. As seen in Table 6, it has been found that also in Example 2, water repellency or oil repellency and color characteristics can be controlled as in Example 1 by controlling the ratio of Si—OH bonds or the ratio of CF bonds/Si—OH bonds contained in the silicon compound coated oxide particles. In the present invention, silicon compound coated iron oxide particles are preferably silicon compound coated iron oxide particles wherein a ratio of CF bonds/Si—OH bonds is 0 or more and 4.5 or less, a ratio of Si—OH bonds is 5% or more and 70% or less, and an average molar absorption coefficient in the wavelength range of 200 nm to 380 nm in the state of a dispersion in which the silicon compound coated iron oxide particles are dispersed in a dispersion medium is 1,500 L/(mol·cm) or more.

TABLE 4

|  | Formulation of the 1st fluid (liquid A: oxide raw material liquid) | | | | Formulation of the 2nd fluid (liquid B: oxide precipitation solvent) | | | |
| --- | --- | --- | --- | --- | --- | --- | --- | --- |
|  | Formulation | | | | Formulation | | | |
|  | Raw material [wt %] | Raw material [wt %] | pH | pH [° C.] | Raw material [wt %] | Raw material [wt %] | pH | pH [° C.] |
| Example 2-1 | $Fe(NO_3)_3 \cdot 9H_2O$ [3.00 wt %] | Pure water [97.00 wt %] | 1.28 | 21.2 | NaOH [9.00 wt %] | Pure water [91.00 wt %] | >14 | — |
| Example 2-2 | $Fe(NO_3)_3 \cdot 9H_2O$ [3.00 wt %] | Pure water [97.00 wt %] | 1.28 | 21.2 | NaOH [9.00 wt %] | Pure water [91.00 wt %] | >14 | — |
| Example 2-3 | $Fe(NO_3)_3 \cdot 9H_2O$ [3.00 wt %] | Pure water [97.00 wt %] | 1.28 | 21.2 | NaOH [9.00 wt %] | Pure water [91.00 wt %] | >14 | — |
| Example 2-4 | $Fe(NO_3)_3 \cdot 9H_2O$ [3.00 wt %] | Pure water [97.00 wt %] | 1.28 | 21.2 | NaOH [9.00 wt %] | Pure water [91.00 wt %] | >14 | — |
| Example 2-5 | $Fe(NO_3)_3 \cdot 9H_2O$ [3.00 wt %] | Pure water [97.00 wt %] | — | — | NaOH [9.00 wt %] | Pure water [91.00 wt %] | >14 | — |
| Example 2-6 | $Fe(NO_3)_3 \cdot 9H_2O$ [3.00 wt %] | Pure water [97.00 wt %] | — | — | NaOH [9.00 wt %] | Pure water [91.00 wt %] | >14 | — |
| Comparative Example 2 | $Fe(NO_3)_3 \cdot 9H_2O$ [3.00 wt %] | Pure water [97.00 wt %] | 1.28 | 21.2 | NaOH [9.00 wt %] | Pure water [91.00 wt %] | >14 | — |

|  | Formulation of the 3rd fluid (liquid C: silicon compound raw material liquid) | | | | |
| --- | --- | --- | --- | --- | --- |
|  | Formulation | | | | |
|  | Raw material [wt %] | Raw material [wt %] | Raw material [wt %] | pH | pH [° C.] |
| Example 2-1 | MeOH [98.6592 wt %] | fluorinating agent 1 [0.8569 wt %] | TEOS [0.4839 wt %] | 5.96 | 20.9 |
| Example 2-2 | MeOH [98.6592 wt %] | fluorinating agent 1 [0.8569 wt %] | TEOS [0.4839 wt %] | 5.96 | 20.9 |
| Example 2-3 | MeOH [98.6592 wt %] | fluorinating agent 1 [0.8569 wt %] | TEOS [0.4839 wt %] | 5.96 | 20.9 |
| Example 2-4 | MeOH [99.1931 wt %] | fluorinating agent 2 [0.5649 wt %] | TEOS [0.2420 wt %] | 5.99 | 20.0 |
| Example 2-5 | NMP [99.131 wt %] | fluorinating agent 3 [0.7041 wt %] | TEOS [0.1649 wt %] | — | — |
| Example 2-6 | NMP [98.9085 wt %] | fluorinating agent 4 [0.8946 wt %] | TEOS [0.1969 wt %] | — | — |
| Comparative Example 2 | MeOH [99.2054 wt %] | — | TEOS [0.7946 wt %] | 5.88 | 17.7 |

TABLE 5

| | Introduction flow rate (liquid sending flow rate) [ml/min] | | | Introduction temperature (liquid sending temperature) [° C.] | | | Introduction pressure (liquid sending pressure) [MPaG] | | | Discharged liquid | |
|---|---|---|---|---|---|---|---|---|---|---|---|
| | Liquid A | Liquid B | Liquid C | Liquid A | Liquid B | Liquid C | Liquid A | Liquid B | Liquid C | pH | Temperature [° C.] |
| Example 2-1 | 600 | 50 | 100 | 106 | 72 | 70 | 0.314 | 0.10 | 0.10 | >14 | — |
| Example 2-2 | 600 | 50 | 100 | 121 | 85 | 75 | 0.326 | 0.10 | 0.10 | >14 | — |
| Example 2-3 | 600 | 50 | 100 | 143 | 96 | 89 | 0.316 | 0.10 | 0.10 | >14 | — |
| Example 2-4 | 600 | 50 | 100 | 108 | 71 | 70 | 0.331 | 0.10 | 0.10 | >14 | — |
| Example 2-5 | 400 | 50 | 100 | 109 | 70 | 72 | 0.361 | 0.10 | 0.10 | — | — |
| Example 2-6 | 400 | 50 | 100 | 108 | 70 | 71 | 0.331 | 0.10 | 0.10 | — | — |
| Comparative Example 2 | 600 | 50 | 100 | 105 | 71 | 72 | 0.346 | 0.10 | 0.10 | >14 | — |

| | F/Si/Fe [molar ratio] | | | | | | Average primary particle diameter [nm] |
|---|---|---|---|---|---|---|---|
| | [Calculated value] | | | [EDS] | | | |
| | F | Si | Fe | F | Si | Fe | |
| Example 2-1 | 14.6 | 6.2 | 79.2 | 14.3 | 6.1 | 79.6 | 6.4 |
| Example 2-2 | 14.6 | 6.2 | 79.2 | 14.1 | 6.3 | 79.6 | 5.4 |
| Example 2-3 | 14.6 | 6.2 | 79.2 | 14.9 | 6.0 | 79.1 | 5.9 |
| Example 2-4 | 11.4 | 5.5 | 83.1 | 11.2 | 5.9 | 82.9 | 6.8 |
| Example 2-5 | 5.0 | 7.3 | 87.8 | 5.1 | 7.1 | 87.8 | 6.2 |
| Example 2-6 | 4.7 | 7.5 | 87.8 | 4.9 | 7.6 | 87.5 | 5.9 |
| Comparative Example 2 | 0.0 | 6.3 | 93.7 | 0.0 | 6.1 | 93.9 | 7.1 |

TABLE 6

| | | Example 2-1 | Example 2-2 | Example 2-3 | Example 2-4 | Example 2-5 | Example 2-6 | Comparative Example 2 |
|---|---|---|---|---|---|---|---|---|
| Ratio of Si—OH [%] | | 42.6 | 22.2 | 5.2 | 57.6 | 59.0 | 65.8 | 72.9 |
| Ratio of CF [%] | | 7.6 | 15.2 | 19.3 | 5.3 | 5.1 | 1.8 | 0.0 |
| Ratio of CF bonds/Si—OH bonds | | 0.18 | 0.69 | 3.71 | 0.09 | 0.09 | 0.03 | 0.00 |
| Average reflectivity [%] | 780-2,500 nm | 63.4 | 66.4 | 69.3 | 61.2 | 58.2 | 55.4 | 49.3 |
| Average molar absorption coefficient [L/l(mol · cm)] | 200-380 nm (dispersion medium: PGME) | 1739 | 1801 | 1833 | 1703 | 1689 | 1613 | 1122*) |
| Average tranmittance [%] | 200-380 nm (dispersion medium: PGME) | 4.9 | 6.9 | 7.1 | 3.9 | 4.3 | 5.1 | 5.9*) |
| | 380-780 nm (dispersion medium: PGME) | 88.1 | 83.2 | 81.2 | 87.1 | 86.6 | 86.3 | 88.1*) |
| Contact angle [°] | Pure water | 151.5 | 157.9 | 160.6 | 131.8 | 129.1 | 116.2 | 65.3 |
| Contact angle [°] | Castor oil | 85.9 | 92.2 | 94.6 | 75.2 | 74.3 | 68.4 | 13.9 |

*)PG was used as a dispersion medium in average molar absorption coefficient and average transmittance measurements.

Example 3

Example 3 below describes silicon compound coated cerium oxide particles in which at least a part of a surface of a cerium oxide particle as an oxide particle is coated with a silicon compound. The particles were prepared in the same manner as in Examples 1-1 to 1-6 except that the preparation conditions were changed to those shown in Tables 7 and 8. Regarding the substances represented by the chemical formula and abbreviations set forth in Table 7, MeOH is methanol (Godo Co., Ltd.), TEOS is tetraethyl orthosilicate (Wako Pure Chemical Industry Ltd.), $Ce(NO_3)_3 \cdot 6H_2O$ is cerium nitrate hexahydrate (Kanto Kagaku Co., Ltd.), NaOH is sodium hydroxide (Kanto Kagaku Co., Inc.), NMP is N-methyl-2-pyrrolidone (Kishida Chemical Co., Ltd.), fluorinating agent 1 is triethoxy-1H, 1H, 2H, 2H-heptadecafluorodecylsilane (Tokyo Chemical Industry Co., Ltd.), fluorinating agent 2 is trimethoxy-(3,3,3-trifluoropropyl)-silane (Tokyo Chemical Industry Co., Ltd.), fluorinating agent 3 is trifluoroacetic anhydride (Kanto Kagaku Co., Inc.), and fluorinating agent 4 is trifluoromethanesulfonic anhydride (Kanto Kagaku Co., Inc.).

As an STEM mapping result and linear analysis result and XRD measurement result, the same results as in Example 1 were obtained, and in the XRD measurement result, only a peak derived from $CeO_2$ was detected.

Table 9 shows a ratio of Si—OH bonds, ratio of CF bonds, ratio of CF bonds/Si—OH bonds, average reflectivity, average molar absorption coefficient, average transmittance, and contact angle of the silicon compound coated cerium oxide particles obtained in Examples 3-1 to 3-6 and Comparative Example 3. As seen in Table 9, it has been found that also in Example 3, water repellency or oil repellency and color characteristics can be controlled as in Examples 1 and 2 by controlling the Si—OH ratio or the ratio of CF bonds/Si—OH bonds contained in the silicon compound coated oxide particles. In the present invention, silicon compound coated cerium oxide particles are preferably silicon compound coated cerium oxide particles wherein a ratio of CF bonds/Si—OH bonds is 0 or more and 4.5 or less, a ratio of Si—OH bonds is 5% or more and 70% or less, and an average molar absorption coefficient in the wavelength range of 200 nm to 380 nm in the state of a dispersion in which the silicon compound coated cerium oxide particles are dispersed in a dispersion medium is 3,500 L/(mol·cm) or more.

TABLE 7

|  | Formulation of the 1st fluid (liquid A: oxide raw material liquid) | | | | Formulation of the 2nd fluid (liquid B: oxide precipitation solvent) | | | |
| --- | --- | --- | --- | --- | --- | --- | --- | --- |
|  | Formulation | | | | Formulation | | | |
|  | Raw material [wt %] | Raw material [wt %] | pH | pH [° C.] | Raw material [wt %] | Raw material [wt %] | pH | pH [° C.] |
| Example 3-1 | Ce(NO$_3$)$_3$·6H$_2$O [3.00 wt %] | Pure water [97.00 wt %] | 1.56 | 23.1 | NaOH [9.00 wt %] | Pure water [91.00 wt %] | >14 | — |
| Example 3-2 | Ce(NO$_3$)$_3$·6H$_2$O [3.00 wt %] | Pure water [97.00 wt %] | 1.56 | 23.1 | NaOH [9.00 wt %] | Pure water [91.00 wt %] | >14 | — |
| Example 3-3 | Ce(NO$_3$)$_3$·6H$_2$O [3.00 wt %] | Pure water [97.00 wt %] | 1.56 | 23.1 | NaOH [9.00 wt %] | Pure water [91.00 wt %] | >14 | — |
| Example 3-4 | Ce(NO$_3$)$_3$·6H$_2$O [3.00 wt %] | Pure water [97.00 wt %] | 1.56 | 23.1 | NaOH [9.00 wt %] | Pure water [91.00 wt %] | >14 | — |
| Example 3-5 | Ce(NO$_3$)$_3$·6H$_2$O [3.00 wt %] | NMP [97.00 wt %] | — | — | NaOH [9.00 wt %] | Pure water [91.00 wt %] | >14 | — |
| Example 3-6 | Ce(NO$_3$)$_3$·6H$_2$O [3.00 wt %] | NMP [97.00 wt %] | — | — | NaOH [9.00 wt %] | Pure water [91.00 wt %] | >14 | — |
| Comparative Example 3 | Ce(NO$_3$)$_3$·6H$_2$O [3.00 wt %] | Pure water [97.00 wt %] | 1.56 | 23.1 | NaOH [9.00 wt %] | Pure water [91.00 wt %] | >14 | — |

|  | Formulation of the 3rd fluid (liquid C: silicon compound raw material liquid) | | | | |
| --- | --- | --- | --- | --- | --- |
|  | Formulation | | | | |
|  | Raw material [wt %] | Raw material [wt %] | Raw material [wt %] | pH | [° C.] |
| Example 3-1 | MeOH [98.6592 wt %] | fluorinating agent 1 [0.8569 wt %] | TEOS [0.4839 wt %] | 5.96 | 20.9 |
| Example 3-2 | MeOH [98.6592 wt %] | fluorinating agent 1 [0.8569 wt %] | TEOS [0.4839 wt %] | 5.96 | 20.9 |
| Example 3-3 | MeOH [98.6592 wt %] | fluorinating agent 1 [0.8569 wt %] | TEOS [0.4839 wt %] | 5.96 | 20.9 |
| Example 3-4 | MeOH [99.1931 wt %] | fluorinating agent 2 [0.5649 wt %] | TEOS [0.2420 wt %] | 5.99 | 20.0 |
| Example 3-5 | NMP [99.1310 wt %] | fluorinating agent 3 [0.7041 wt %] | TEOS [0.1649 wt %] | — | — |
| Example 3-6 | NMP [98.9085 wt %] | fluorinating agent 4 [0.8946 wt %] | TEOS [0.1969 wt %] | — | — |
| Comparative Example 3 | MeOH [99.2054 wt %] | — | TEOS [0.7946 wt %] | 5.88 | 17.7 |

TABLE 8

|  | Introduction flow rate (liquid sending flow rate) [ml/min] | | | Introduction temperature (liquid sending temperature) [° C.] | | | Introduction pressure (liquid sending pressure) [MPaG] | | | Discharged liquid | |
| --- | --- | --- | --- | --- | --- | --- | --- | --- | --- | --- | --- |
|  | Liquid A | Liquid B | Liquid C | Liquid A | Liquid B | Liquid C | Liquid A | Liquid B | Liquid C | pH | Temperature [° C.] |
| Example 3-1 | 300 | 45 | 100 | 79 | 63 | 65 | 0.331 | 0.10 | 0.10 | >14 | — |
| Example 3-2 | 300 | 45 | 100 | 104 | 72 | 75 | 0.361 | 0.10 | 0.10 | >14 | — |
| Example 3-3 | 300 | 45 | 100 | 135 | 96 | 89 | 0.331 | 0.10 | 0.10 | >14 | — |
| Example 3-4 | 300 | 45 | 100 | 81 | 65 | 63 | 0.361 | 0.10 | 0.10 | >14 | — |
| Example 3-5 | 150 | 25 | 100 | 79 | 64 | 64 | 0.316 | 0.10 | 0.10 | — | — |

TABLE 8-continued

| | | | | | | | | | | | |
|---|---|---|---|---|---|---|---|---|---|---|---|
| Example 3-6 | 150 | 25 | 100 | 80 | 64 | 65 | 0.344 | 0.10 | 0.10 | — | — |
| Comparative Example 3 | 300 | 45 | 100 | 80 | 64 | 65 | 0.367 | 0.10 | 0.10 | >14 | — |

| | F/Si/Ce [molar ratio] | | | | | | Average primary particle diameter [nm] |
|---|---|---|---|---|---|---|---|
| | [Calculated value] | | | [EDS] | | | |
| | F | Si | Ce | F | Si | Ce | |
| Example 3-1 | 25.4 | 10.7 | 63.9 | 25.1 | 10.6 | 64.3 | 11.3 |
| Example 3-2 | 25.4 | 10.7 | 63.9 | 25.9 | 10.9 | 63.2 | 12.3 |
| Example 3-3 | 25.4 | 10.7 | 63.9 | 25.1 | 10.1 | 64.8 | 11.3 |
| Example 3-4 | 20.6 | 9.9 | 69.5 | 20.3 | 9.8 | 69.9 | 11.3 |
| Example 3-5 | 11.6 | 17.0 | 71.4 | 11.8 | 17.1 | 71.1 | 11.6 |
| Example 3-6 | 10.9 | 17.5 | 71.6 | 10.6 | 16.9 | 72.5 | 11.3 |
| Comparative Example 3 | 0.0 | 12.7 | 87.3 | 0.0 | 12.3 | 87.7 | 11.4 |

TABLE 9

| | | Example 3-1 | Example 3-2 | Example 3-3 | Example 3-4 | Example 3-5 | Example 3-6 | Comparative Example 3 |
|---|---|---|---|---|---|---|---|---|
| Ratio of Si—OH [%] | | 39.6 | 21.2 | 5.3 | 56.4 | 60.0 | 66.2 | 72.2 |
| Ratio of CF [%] | | 7.1 | 16.8 | 19.6 | 5.3 | 5.1 | 2.3 | 0.0 |
| Ratio of CF bonds/Si—OH bonds | | 0.71 | 1.58 | 3.70 | 0.34 | 0.29 | 0.07 | 0.00 |
| Average reflectivity [%] | 780-2,500 nm | 68.6 | 71.9 | 76.4 | 66.4 | 64.1 | 61.2 | 48.6 |
| Average molar absorption coefficient [L/l(mol · cm)] | 200-380 nm (dispersion medium: PGME) | 3894 | 3999 | 4064 | 3794 | 3597 | 3569 | 3126*⁾ |
| Average transmittance [%] | 200-380 nm (dispersion medium: PGME) | 6.6 | 6.6 | 7.1 | 6.6 | 5.5 | 6.2 | 5.9*⁾ |
| | 380-780 nm (dispersion medium: PGME) | 88.1 | 83.2 | 81.2 | 87.1 | 86.6 | 86.3 | 88.1*⁾ |
| Contact angle [°] | Pure water | 152.6 | 158.6 | 160.7 | 135.8 | 132.1 | 118.2 | 68.4 |
| Contact angle [°] | Castor oil | 86.9 | 93.9 | 98.1 | 74.9 | 73.1 | 67.1 | 24.6 |

*⁾PG was used as a dispersion medium in average molar absorption coefficient and average transmittance measurements.

Example 4

Example 4 below describes silicon compound coated titanium oxide particles in which at least a part of a surface of a titanium oxide particle as an oxide particle is coated with a silicon compound. The particles were prepared in the same manner as in Examples 1-1 to 1-6 except that the preparation conditions were changed to those shown in Tables 10 and 11. Regarding the substances represented by the chemical formula and abbreviations set forth in Table 10, MeOH is methanol (Godo Co., Ltd.), TEOS is tetraethyl orthosilicate (Wako Pure Chemical Industry Ltd.), $TiOSO_4 \cdot nH_2O$ is titanyl sulfate n hydrate (Kanto Kagaku Co., Ltd., $TiOSO_4 \cdot 2H_2O$ was used), NaOH is sodium hydroxide (Kanto Kagaku Co., Inc.), NMP is N-methyl-2-pyrrolidone (Kishida Chemical Co., Ltd.), fluorinating agent 1 is triethoxy-1H, 1H, 2H, 2H-heptadecafluorodecylsilane (Tokyo Chemical Industry Co., Ltd.), fluorinating agent 2 is trimethoxy-(3,3,3-trifluoropropyl)-silane (Tokyo Chemical Industry Co., Ltd.), fluorinating agent 3 is trifluoroacetic anhydride (Kanto Kagaku Co., Inc.), and fluorinating agent 4 is trifluoromethanesulfonic anhydride (Kanto Kagaku Co., Inc.).

As an STEM mapping result and linear analysis result and XRD measurement result, the same results as in Example 1 were obtained, and in the XRD measurement result, only a peak derived from $TiO_2$ was detected.

Table 12 shows a ratio of Si—OH bonds, ratio of CF bonds, ratio of CF bonds/Si—OH bonds, average reflectivity, average molar absorption coefficient, average transmittance, and contact angle of the silicon compound coated titanium oxide particles obtained in Examples 4-1 to 4-6 and Comparative Example 4. As seen in Table 12, it has been found that also in Example 4, water repellency or oil repellency and color characteristics can be controlled as in Examples 1 to 3 by controlling the ratio of Si—OH bonds or the ratio of CF bonds/Si—OH bonds contained in the silicon compound coated oxide particles. In the present invention, silicon compound coated titanium oxide particles are preferably silicon compound coated titanium oxide particles wherein a ratio of CF bonds/Si—OH bonds is 0 or more and 4.5 or less, a ratio of Si—OH bonds is 5% or more and 70% or less, and an average molar absorption coefficient in the wavelength range of 200 nm to 380 nm in the state of a dispersion in which the silicon compound coated titanium oxide particles are dispersed in a dispersion medium is 4,000 L/(mol·cm) or more.

TABLE 10

| | Formulation of the 1st fluid (liquid A: oxide raw material liquid) | | | | Formulation of the 2nd fluid (liquid B: oxide precipitation solvent) | | | |
|---|---|---|---|---|---|---|---|---|
| | Formulation | | | | Formulation | | | |
| | Raw material [wt %] | Raw material [wt %] | pH | pH [° C.] | Raw material [wt %] | Raw material [wt %] | pH | pH [° C.] |
| Example 4-1 | TiOSO₄·nH₂O [3.00 wt %] | Pure water [97.00 wt %] | 1.38 | 24.2 | NaOH [9.00 wt %] | Pure water [91.00 wt %] | >14 | — |
| Example 4-2 | TiOSO₄·nH₂O [3.00 wt %] | Pure water [97.00 wt %] | 1.38 | 24.2 | NaOH [9.00 wt %] | Pure water [91.00 wt %] | >14 | — |
| Example 4-3 | TiOSO₄·nH₂O [3.00 wt %] | Pure water [97.00 wt %] | 1.38 | 24.2 | NaOH [9.00 wt %] | Pure water [91.00 wt %] | >14 | — |
| Example 4-4 | TiOSO₄·nH₂O [3.00 wt %] | Pure water [97.00 wt %] | 1.38 | 24.2 | NaOH [9.00 wt %] | Pure water [91.00 wt %] | >14 | — |
| Example 4-5 | TiOSO₄·nH₂O [3.00 wt %] | Pure water [97.00 wt %] | — | — | NaOH [9.00 wt %] | Pure water [91.00 wt %] | >14 | — |
| Example 4-6 | TiOSO₄·nH₂O [3.00 wt %] | Pure water [97.00 wt %] | — | — | NaOH [9.00 wt %] | Pure water [91.00 wt %] | >14 | — |
| Comparative Example 4 | TiOSO₄·nH₂O [3.00 wt %] | Pure water [97.00 wt %] | 1.38 | 24.2 | NaOH [9.00 wt %] | Pure water [91.00 wt %] | >14 | — |

| | Formulation of the 3rd fluid (liquid C: silicon compound raw material liquid) | | | | |
|---|---|---|---|---|---|
| | Formulation | | | | |
| | Raw material [wt %] | Raw material [wt %] | Raw material [wt %] | pH | pH [° C.] |
| Example 4-1 | MeOH [98.6592 wt %] | fluorinating agent 1 [0.8569 wt %] | TEOS [0.4839 wt %] | 5.96 | 20.9 |
| Example 4-2 | MeOH [98.6592 wt %] | fluorinating agent 1 [0.8569 wt %] | TEOS [0.4839 wt %] | 5.96 | 20.9 |
| Example 4-3 | MeOH [98.6592 wt %] | fluorinating agent 1 [0.8569 wt %] | TEOS [0.4839 wt %] | 5.96 | 20.9 |
| Example 4-4 | MeOH [99.1931 wt %] | fluorinating agent 2 [0.5649 wt %] | TEOS [0.2420 wt %] | 5.99 | 20.0 |
| Example 4-5 | NMP [99.1310 wt %] | fluorinating agent 3 [0.7041 wt %] | TEOS [0.1649 wt %] | — | — |
| Example 4-6 | NMP [98.9085 wt %] | fluorinating agent 4 [0.8946 wt %] | TEOS [0.1969 wt %] | — | — |
| Comparative Example 4 | MeOH [99.2054 wt %] | — | TEOS [0.7946 wt %] | 5.88 | 17.7 |

TABLE 11

| | Introduction flow rate (liquid sending flow rate) [ml/min] | | | Introduction temperature (liquid sending temperature) [° C.] | | | Introduction pressure (liquid sending pressure) [MPaG] | | | Discharged liquid | |
|---|---|---|---|---|---|---|---|---|---|---|---|
| | Liquid A | Liquid B | Liquid C | Liquid A | Liquid B | Liquid C | Liquid A | Liquid B | Liquid C | pH | Temperature [° C.] |
| Example 4-1 | 200 | 50 | 100 | 102 | 75 | 78 | 0.298 | 0.10 | 0.10 | >14 | — |
| Example 4-2 | 200 | 50 | 100 | 115 | 85 | 80 | 0.284 | 0.10 | 0.10 | >14 | — |
| Example 4-3 | 200 | 50 | 100 | 138 | 92 | 90 | 0.298 | 0.10 | 0.10 | >14 | — |
| Example 4-4 | 200 | 50 | 100 | 101 | 76 | 77 | 0.294 | 0.10 | 0.10 | >14 | — |
| Example 4-5 | 200 | 50 | 100 | 102 | 75 | 79 | 0.279 | 0.10 | 0.10 | — | — |
| Example 4-6 | 200 | 50 | 100 | 102 | 76 | 78 | 0.299 | 0.10 | 0.10 | — | — |
| Comparative Example 4 | 200 | 50 | 100 | 103 | 76 | 77 | 0.279 | 0.10 | 0.10 | >14 | — |

| | F/Si/Ti [molar ratio] | | | | | | Average primary particle diameter [nm] |
|---|---|---|---|---|---|---|---|
| | [Calculated value] | | | [EDS] | | | |
| | F | Si | Ti | F | Si | Ti | |
| Example 4-1 | 19.5 | 8.2 | 72.3 | 19.1 | 8.3 | 72.6 | 5.6 |
| Example 4-2 | 19.5 | 8.2 | 72.3 | 19.6 | 8.1 | 72.3 | 5.4 |
| Example 4-3 | 19.5 | 8.2 | 72.3 | 19.0 | 8.6 | 72.4 | 5.8 |
| Example 4-4 | 15.4 | 7.5 | 77.1 | 15.6 | 7.3 | 77.1 | 5.9 |

TABLE 11-continued

| | | | | | | | |
|---|---|---|---|---|---|---|---|
| Example 4-5 | 4.8 | 7.1 | 88.1 | 4.9 | 6.9 | 88.2 | 5.3 |
| Example 4-6 | 4.6 | 7.3 | 88.1 | 4.5 | 7.2 | 88.3 | 5.4 |
| Comparative Example 4 | 0.0 | 9.0 | 91.0 | 0.0 | 9.1 | 90.9 | 5.5 |

TABLE 12

| | | Example 4-1 | Example 4-2 | Example 4-3 | Example 4-4 | Example 4-5 | Example 4-6 | Comparative Example 4 |
|---|---|---|---|---|---|---|---|---|
| Ratio of Si—OH [%] | | 39.8 | 21.6 | 5.2 | 56.2 | 57.2 | 65.2 | 71.8 |
| Ratio of CF [%] | | 7.4 | 15.0 | 19.4 | 5.5 | 4.9 | 1.4 | 0.0 |
| Ratio of CF bonds/Si—OH bonds | | 0.19 | 0.69 | 3.73 | 0.10 | 0.09 | 0.02 | 0.00 |
| Average reflectivity [%] | 780-2,500 nm | 64.1 | 68.7 | 72.6 | 61.8 | 58.6 | 55.3 | 47.3 |
| Average molar absorption coefficient [L/I(mol · cm)] | 200-380 nm (dispersion medium: PGME) | 4545 | 4636 | 4763 | 4369 | 4236 | 4162 | 3456*) |
| Average tranmittance [%] | 200-380 nm (dispersion medium: PGME) | 4.9 | 6.3 | 8.2 | 7.6 | 8.9 | 5.9 | 6.2*) |
| | 380-780 nm (dispersion medium: PGME) | 85.9 | 90.3 | 91.9 | 83.6 | 88.6 | 84.9 | 90.1*) |
| Contact angle [°] | Pure water | 151.0 | 156.0 | 159.0 | 134.4 | 129.3 | 112.5 | 23.1 |
| Contact angle [°] | Castor oil | 83.9 | 91.4 | 95.5 | 73.2 | 72.8 | 59.1 | 56.8 |

*)PG was used as a dispersion medium in average molar absorption coefficient and average transmittance measurements.

Example 5

In Example 5, the silicon compound coated zinc oxide particles were prepared in the same manner as in Example 1 except for using an apparatus described in JP 2009-112892, and using a method of mixing and reacting liquid A, liquid B and liquid C. Here, the apparatus of JP 2009-112892 was an apparatus described in FIG. 1 of JP 2009-112892, and the inner diameter of the stirring tank was 80 mm, and the gap between the outer end of the mixing tool and the inner peripheral surface of the stirring tank was 0.5 mm, and the rotor rotational speed of the stirring blade was 7,200 rpm. Further, liquid A was introduced into the stirring tank, and liquid B was added, mixed and reacted in the thin film consisting of liquid A that was crimped to the inner peripheral surface of the stirring tank. As a result of TEM observation, the silicon compound coated zinc oxide particles having a primary particle diameter of about 30 nm to 40 nm were observed. Further, in the same manner as in Comparative Example 1, not fluorinated zinc oxide particles having the same diameter as that of Example 5 were prepared (Comparative Example 5).

As an STEM mapping result and linear analysis result and XRD measurement result, the same results as in Example 1 were obtained.

Table 13 shows a ratio of Si—OH bonds, ratio of CF bonds, ratio of CF bonds/Si—OH bonds, average reflectivity, average molar absorption coefficient, average transmittance, and contact angle of the silicon compound coated zinc oxide particles obtained in Example 5 and Comparative Example 5. As seen in Table 13, it has been found that even in Example 5, which was performed using an apparatus different from the apparatus described in Patent Literature 7, water repellency or oil repellency and color characteristics can be controlled as in Examples 1 to 4 by controlling the ratio of Si—OH bonds or the ratio of CF bonds/Si—OH bonds contained in the silicon compound coated oxide particles.

TABLE 13

| | | Example 5-1 | Example 5-2 | Example 5-3 | Example 5-4 | Example 5-5 | Example 5-6 | Comparative Example 5 |
|---|---|---|---|---|---|---|---|---|
| Ratio of Si—OH [%] | | 60.0 | 52.2 | 46.2 | 42.2 | 20.2 | 6.5 | 72.0 |
| Ratio of CF [%] | | 4.8 | 5.9 | 7.8 | 9.8 | 17.1 | 20.6 | 0.0 |
| Ratio of CF bonds/Si—OH bonds | | 0.08 | 0.11 | 0.17 | 0.23 | 0.85 | 3.17 | 0.00 |
| Average reflectivity [%] | 780-2,500 nm | 61.2 | 62.3 | 63.9 | 68.4 | 71.2 | 73.3 | 47.9 |
| Average molar absorption coefficient [L/I(mol · cm)] | 200-380 nm (dispersion medium: PGME) | 746 | 839 | 912 | 1020 | 1123 | 1364 | 416*) |
| Average tranmittance [%] | 200-380 nm (dispersion medium: PGME) | 13.3 | 13.2 | 14.2 | 13.2 | 12.6 | 11.6 | 13.2*) |
| | 380-780 nm (dispersion medium: PGME) | 90.1 | 91.2 | 80.9 | 83.6 | 81.4 | 83.6 | 88.2*) |

TABLE 13-continued

|  |  | Example 5-1 | Example 5-2 | Example 5-3 | Example 5-4 | Example 5-5 | Example 5-6 | Comparative Example 5 |
|---|---|---|---|---|---|---|---|---|
| Contact angle [°] | Pure water | 126.5 | 135.7 | 144.6 | 148.9 | 155.6 | 157.6 | 85.6 |
| Contact angle [°] | Castor oil | 68.7 | 75.4 | 81.9 | 86.2 | 90.4 | 93.9 | 33.8 |

*)PG was used as a dispersion medium in average molar absorption coefficient and average transmittance measurements.

The invention claimed is:

1. A method of producing silicon compound coated oxide particles in which at least a part of a surface of a metal oxide particle is coated with a silicon compound, wherein the silicon compound is a silicon compound containing an amorphous silicon oxide, and wherein
   (a) wettability and color characteristics of the silicon compound coated oxide particles are controlled by controlling a ratio of Si—OH bonds contained in the silicon compound coated oxide particles, wherein the ratio is an area ratio of a peak obtained by separating waveforms as a peak from Si—OH bonds relative to a total area of peaks obtained by separating waveforms in the wavenumber range of 650 cm$^{-1}$ to 1,300 cm$^{-1}$ in an infrared absorption spectrum; or
   (b) the silicon compound coated oxide particles comprise C—F bonds, and wettability and color characteristics of the silicon compound coated oxide particles are controlled by controlling a ratio of C—F bonds/Si—OH bonds which is a ratio of C—F bonds relative to Si—OH bonds contained in the silicon compound coated oxide particles, which is calculated by separating waveforms of peaks derived from the silicon compound coated oxide particles between wavenumbers 650 cm$^{-1}$ and 1,300 cm$^{-1}$ in an infrared absorption spectrum.

2. The method of producing silicon compound coated oxide particles according to claim 1, wherein the wettability is water repellency or oil repellency.

3. The method of producing silicon compound coated oxide particles according to claim 1, wherein the color characteristics are any one of reflectivity, transmittance, and molar absorption coefficient.

4. The method of producing silicon compound coated oxide particles according to claim 1, wherein the ratio of Si—OH bonds or the ratio of C—F bonds/Si—OH bonds contained in the silicon compound coated oxide particles is calculated by separating waveforms of peaks derived from the silicon compound coated oxide particles between wavenumbers 650 cm$^{-1}$ and 1,300 cm$^{-1}$ in an infrared absorption spectrum measured by the total reflection measurement method (ATR method).

5. The method of producing silicon compound coated oxide particles according to claim 4, wherein the peak of the separated waveform derived from C—F bonds is a peak of the separated waveform in the wavenumber range of 1,200 cm$^{-1}$ to 1,220 cm$^{-1}$.

6. The method of producing silicon compound coated oxide particles according to claim 1, wherein the ratio of Si—OH bonds contained in the silicon compound is controlled by performing a modification treatment of a functional group contained in the silicon compound.

7. The method of producing silicon compound coated oxide particles according to claim 6, wherein the modification treatment of a functional group is a fluorinating treatment.

8. The method of producing silicon compound coated oxide particles according to claim 1, wherein the ratio of Si—OH bonds contained in the silicon compound is controlled by performing a heat treatment to a dispersion in which the silicon compound coated oxide particles are dispersed in a dispersion medium.

9. The method of producing silicon compound coated oxide particles according to claim 1, wherein the ratio of Si—OH bonds contained in the silicon compound is controlled between two processing surfaces being capable of approaching to and separating from each other and rotating relative to each other.

10. The method of producing silicon compound coated oxide particles according to claim 8, wherein the dispersion is a coating film, film or glass, and the water repellency or oil repellency and color characteristics of the silicon compound coated oxide particles are controlled by performing a heat treatment to the dispersion.

11. The method of producing silicon compound coated oxide particles according to claim 1, wherein
   (a) an average reflectivity in the wavelength range of 780 nm to 2,500 nm is controlled to be high, by controlling the ratio of Si—OH bonds to be low; or
   (b) an average molar absorption coefficient in the wavelength range of 200 nm to 380 nm of a dispersion in which the silicon compound coated oxide particles are dispersed in an organic solvent, is controlled to be high, by controlling the ratio of Si—OH bonds to be low.

12. Silicon compound coated oxide particles, in which at least a part of a surface of a metal oxide particle is coated with a silicon compound, wherein the silicon compound is a silicon compound containing an amorphous silicon oxide, and
   wherein wettability and color characteristics of the metal oxide particles are changed by coating at least a part of the surface of the metal oxide particle with the silicon compound;
   a ratio of C—F bonds/Si—OH bonds contained in the silicon compound coated oxide particles, which is calculated by separating waveforms of peaks derived from the silicon compound coated oxide particles between wavenumbers 650 cm$^{-1}$ and 1,300 cm$^{-1}$ in an infrared absorption spectrum measured by the total reflection measurement method (ATR method), is 0 or more and 4.5 or less; and
   an average molar absorption coefficient in the wavelength range of 200 nm to 380 nm in the state of a dispersion in which the silicon compound coated oxide particles are dispersed in a dispersion medium, is 650 L/(mol·cm) or more.

13. The silicon compound coated oxide particles according to claim 12, wherein the ratio of Si—OH bonds contained in the silicon compound coated oxide particles is 5% or more and 70% or less, wherein the ratio is an area ratio of a peak obtained by separating waveforms as a peak from Si—OH bonds relative to a total area of peaks obtained by separating waveforms in the wavenumber range of 650 cm$^{-1}$ to 1,300 cm$^{-1}$ in an infrared absorption spectrum.

14. The silicon compound coated oxide particles according to claim 12, wherein
   (a) an average reflectivity in the wavelength range of 780 nm to 2,500 nm of the silicon compound coated oxide particles is 50% or more;
   (b) an average transmittance for the lights of wavelengths 200 nm to 380 nm in the state of a dispersion in which the silicon compound coated oxide particles are dispersed in a dispersion medium, is 15% or less, and an average transmittance for the lights of wavelengths 380 nm to 780 nm is 80% or more;
   (c) oxide particles constituting the metal oxide particles are composite oxide particles composed of two or more kinds of elements, and color characteristics of the silicon compound coated oxide particles are in the range of $40 \leq L^* \leq 95$, $-35 \leq a^* \leq 35$, or $-35 \leq b^* \leq 35$ in the $L^*a^*b^*$ color system; or
   (d) a contact angle of a water drop to a coated surface coated with the silicon compound coated oxide particles is 110° or more.

15. A silicon compound coated oxide composition for ultraviolet protection and water repellency or oil repellency, comprising the silicon compound coated oxide particles according to claim 12.

* * * * *